US009617395B2

(12) United States Patent
Saito et al.

(10) Patent No.: US 9,617,395 B2
(45) Date of Patent: Apr. 11, 2017

(54) POLYAMIDE 1010 POLYMER PARTICLES AND METHOD FOR PRODUCING SAME

(75) Inventors: Makiko Saito, Nagoya (JP); Hiroshi Takezaki, Nagoya (JP)

(73) Assignee: Toray Industries, Inc. (JP)

(*) Notice: Subject to any disclaimer, the term of this patent is extended or adjusted under 35 U.S.C. 154(b) by 57 days.

(21) Appl. No.: 14/345,448

(22) PCT Filed: Jul. 11, 2012

(86) PCT No.: PCT/JP2012/067693
§ 371 (c)(1),
(2), (4) Date: Mar. 18, 2014

(87) PCT Pub. No.: WO2013/046860
PCT Pub. Date: Apr. 4, 2013

(65) Prior Publication Data
US 2014/0349113 A1    Nov. 27, 2014

(30) Foreign Application Priority Data

Sep. 27, 2011  (WO) ............... PCT/JP2011/071954
Mar. 23, 2012  (JP) ................................ 2012-067571

(51) Int. Cl.
*B32B 5/16*    (2006.01)
*C08J 3/14*    (2006.01)
(Continued)

(52) U.S. Cl.
CPC ............ *C08J 3/14* (2013.01); *C08G 18/603* (2013.01); *C08G 69/26* (2013.01); *C08L 77/06* (2013.01);
(Continued)

(58) Field of Classification Search
CPC .................................................. C08G 18/063
(Continued)

(56) References Cited

U.S. PATENT DOCUMENTS 4,081,430 A * 3/1978 Minami ............... C08G 69/48
525/420
2006/0269749 A1* 11/2006 Okumura ............... C08J 3/005
428/402

(Continued)

FOREIGN PATENT DOCUMENTS

JP  2007-277546  10/2007
JP  2010-163618   7/2010
(Continued)

OTHER PUBLICATIONS

Sumitomo Kagaku 2006-I Report—Development of Spherical Polyamide Fine powder, Shinto Fine Co., 2006.*
(Continued)

*Primary Examiner* — Holly Le
(74) *Attorney, Agent, or Firm* — DLA Piper LLP (US)

(57) ABSTRACT

The production of polyamide 1010 polymer particles, in which polyamide 1010 resin, a different polymer B and an organic solvent are dissolved and mixed and thereupon an emulsion is formed within a system for phase separation into two phases, being a solution phase having the polyamide 1010 resin as the main component and a solution phase having the polymer B as the main component, and thereafter a poor solvent of the polyamide 1010 resin is brought into contact therewith to precipitate the polyamide 1010 resin, wherein the formation of the emulsion is carried out at a temperature of 100° C. or higher, thereby making it possible to obtain highly crystalline polyamide 1010 particles having a high sphericity.

4 Claims, 9 Drawing Sheets

(51) Int. Cl.
 *C08G 18/60* (2006.01)
 *C08L 77/06* (2006.01)
 *C08G 69/26* (2006.01)
(52) U.S. Cl.
 CPC ........ *C08J 2377/00* (2013.01); *C08J 2377/06* (2013.01); *Y10T 428/2982* (2015.01)
(58) Field of Classification Search
 USPC .............................................. 428/402, 475.5
 See application file for complete search history.

(56) References Cited

U.S. PATENT DOCUMENTS

| | | | |
|---|---|---|---|
| 2011/0070442 | A1 | 3/2011 | Asano et al. |
| 2011/0250156 | A1* | 10/2011 | Jha ....................... A61K 8/0241 424/60 |
| 2011/0311821 | A1* | 12/2011 | Kaiso et al. .................. 428/402 |
| 2013/0038822 | A1 | 2/2013 | Aono et al. |

FOREIGN PATENT DOCUMENTS

| | | |
|---|---|---|
| JP | 2010-189472 | 9/2010 |
| JP | 2011-094128 | 5/2011 |
| JP | 2011-218330 | 11/2011 |
| JP | 2011-219756 | 11/2011 |
| WO | 2009/142231 | 11/2009 |
| WO | 2011/132680 | 10/2011 |

OTHER PUBLICATIONS

Mo et al., The Degree of Crystallinity of Nylo-1010 by WAXD, vol. 12, No. 3, Chinese Journal of Polymer Science, 1994.*

Hongfang, Z., et al., "Study on the Influence of Heat Treatment on the Structure of Polyamide 1010," *Acta Polymerica Sinica,* Feb. 1996, vol. 1, pp. 1-5, with English abstract.

* cited by examiner

Example 3

POLYAMIDE 1010 POLYMER PARTICLES AND METHOD FOR PRODUCING SAME

TECHNICAL FIELD

This disclosure relates to polyamide 1010 polymer particles and a method of producing the same and, in more detail, relates to polyamide 1010 polymer particles excellent in surface smoothness, having a spherical form, good in particle flowability and excellent in stiffness, and a method of producing the same.

BACKGROUND

"Polymer particles" means particles composed of a resin, and the particles generally have a wide range of diameters from several tens of nm to several hundreds of μm. Different from polymer molded products such as films, fibers, injection molded products, and extrusion molded products, polymer particles are used for modification and improvement of various materials by utilizing the large specific surface area and the structure of microparticles.

Their major uses include modifiers for cosmetics, additives for toners, rheology modifiers for paints and the like, agents for medical diagnosis and examination, and additives for molded products such as automobile materials and construction materials. In particular, in recent years, they have been in wider use due to the advantageous microparticle structure of polymer particles, as materials for rapid prototyping and rapid manufacturing, which are techniques to produce custom-made molded products combining with laser processing technologies.

Recently, in fields of electronic information materials and the like such as liquid crystal displays or in fields of cosmetics and paints, for such polymer microparticles, there are increasing demands to be given with higher function and higher accuracy such as higher heat resistance, higher solvent resistance and higher uniformity in particle diameter distribution as compared with conventional ones.

Although among the polymer microparticles polyamide particles have been used since old times in the fields of cosmetic's and paints on account of the features of the raw material such as a strength or an appropriate moisture absorption, the trend in selecting the raw material from non-petroleum materials originating from biomass has been accelerated from the viewpoint of recent global environmental protection and, in particular, polyamide 1010 polymer particles are paid attention to from the viewpoints of functional features of the material and easiness of obtaining the raw material.

As the method of producing polyamide 1010 polymer particles, generally a method of mechanically grinding pellets of polyamide 1010 resin is employed. However, there are problems in points that the particles obtained by grinding are low in sphericity and that the particle diameter distribution is broad.

As a method of improving those efforts, although JP-A-2007-277546 proposes a method of producing polyamide polymer particles by melt-blending polyamide resin and a water soluble component and removing the water soluble component by water after the blending, it remains a problem on particle flowability though spherical particles are obtained.

Further, as represented by JP-A-2010-163618, although a method of dissolving polyamide resin into a solvent such as an alcohol by heating it in the solvent and precipitating polyamide polymer particles while lowering the temperature of the solvent is proposed, it is disclosed that the obtained particles are porous, and it is the present status that a further improved technology as functional microparticles is being required with respect to a point of particle flowability and the like (JP-A-2010-163618, JP-A-2011-218330 and JP-A-2011-219756).

On the other hand, as a method of forming polymer microparticles, although WO 2009/142231 has already proposed a method of obtaining polymer particles by dissolving two or more kinds of resins and utilizing an emulsion due to phase-separation phenomenon of polymer solution, a technical improvement has been required with respect to making polyamide resin, which is a crystalline polymer, into a form of particles.

In conventional methods of producing polyamide 1010 polymer particles, there are problems in flowability and slipperiness of polyamide 1010 polymer particles and, further, in the method wherein the particles become porous, there is a problem in mechanical strength in addition to particle flowability, and therefore, there is a problem in such a point that particle breakage occurs.

It could therefore be helpful to provide polyamide 1010 polymer particles formed in a shape high in sphericity and crystallinity and excellent in particle flowability and mechanical properties such as stiffness.

SUMMARY

We thus provide:

(1) Polyamide 1010 polymer particles characterized in that an average particle diameter is 1 to 100 μm, a sphericity is 80 or higher, and a peak is exhibited at a position of 24 degrees in a spectrum of diffraction angle 2θ determined by wide angle X-ray scattering, (2) the polyamide 1010 polymer particles according to (1), wherein peaks are exhibited at positions of 20 degrees and 24 degrees in the spectrum of diffraction angle 2θ determined by wide angle X-ray scattering, (3) the polyamide 1010 polymer particles according to (1) or (2), wherein a repose angle of particles is 30 degrees or less, (4) the polyamide 1010 polymer particles according to any of (1) to (3), wherein a compressive elasticity modulus determined by a micro compression testing machine is 1.6 GPa or more, (5) the polyamide 1010 polymer particles according to any of (1) to (4), wherein an L value, which is a lightness determined by spectrophotometry, is 70 or higher, (6) a method of producing polyamide 1010 polymer particles, in which an emulsion is formed within a system that causes phase separation into two phases, being a solution phase having polyamide 1010 resin as its main component and a solution phase having a polymer B other than the polyamide 1010 resin as its main component, when the polyamide 1010 resin, the polymer B other than the polyamide 1010 resin, and an organic solvent are dissolved and mixed, and thereafter a poor solvent of the polyamide 1010 resin is brought into contact with the emulsion to precipitate the polyamide 1010 resin, characterized in that the formation of the emulsion is carried out at a temperature of 100° C. or higher, (7) the method of producing polyamide 1010 polymer particles according to (6), wherein an SP value of the polymer B other than the polyamide 1010 resin is 20 $(J/cm^3)^{1/2}$ or higher, (8) the method of producing polyamide 1010 polymer particles according to (6) or (7), wherein a solubility into water at 25° C. of the polymer B other than the polyamide 1010 resin is 1 (g/100 g) or greater, (9) the method of producing polyamide 1010 polymer particles according to any of (6) to (8), wherein the polymer B other than the polyamide 1010 resin has at least any of a hydroxyl group, an ether group, an amide group and a carboxyl group in a molecular structure of the polymer B,
(10) the method of producing polyamide 1010 polymer particles according to any of (6) to (9), wherein the polymer B other than the polyamide 1010 resin is any of a polyvinyl alcohol group, a hydroxyalkyl cellulose, a polyalkylene glycol, a polyvinylpyrrolidone, a water-soluble Nylon and a polyacrylic acid,
(11) the method of producing polyamide 1010 polymer particles according to any of (6) to (10), wherein the polymer B other than the polyamide 1010 resin is a polyvinyl alcohol group, and a content of a sodium acetate in the polyvinyl alcohol group is 0.1 mass % or less,
(12) the method of producing polyamide 1010 polymer particles according to any of (6) to (10), wherein the polymer B other than the polyamide 1010 resin is a polyvinyl alcohol group, and at the time of forming the emulsion, an acid compound is added into said system,
(13) the method of producing polyamide 1010 polymer particles according to (12), wherein the added acid compound is an acid having a first dissociative index (pKa1) of 4.5 or less, and its decomposition temperature is a boiling point of the poor solvent or higher,
(14) the method of producing polyamide 1010 polymer particles according to (12) or (13), wherein the added acid compound is one or more selected from the group consisting of a citric acid, a tartaric acid, a malonic acid, an oxalic acid, an adipic acid, a maleic acid, a malic acid, phthalic acid, a succinic acid and a polyacrylic acid,
(15) the method of producing polyamide 1010 polymer particles according to any of (6) to (14), wherein an SP value of the organic solvent is 20 $(J/cm^3)^{1/2}$ or higher, and a boiling point thereof is 100° C. or higher,
(16) the method of producing polyamide 1010 polymer particles according to any of (6) to (15), wherein the organic solvent is one or more selected from the group consisting of N-methylpyrrolidone, dimethylsulfoxide, N,N-dimethylformamide, N,N-dimethylacetamide and 1,3-dimethyl-2-imidazolidinone,
(17) the method of producing polyamide 1010 polymer particles according to any of (6) to (16), wherein a temperature, at which the poor solvent is brought into contact with the emulsion for precipitating the polyamide 1010 resin after the emulsion is formed, is a temperature of a cooling crystallization temperature of the polyamide 1010 resin or higher, and
(18) the method of producing polyamide 1010 polymer particles according to any of (6) to (17), wherein a solid component and a liquid component are separated after the polyamide 1010 resin is precipitated, the poor solvent is removed from a solution containing a component of the polymer B other than the polyamide 1010 resin removed with polyamide 1010 polymer particles, and the polyamide 1010 resin is added again to a solution having been obtained to form a system which can cause phase separation into two phases of the solution phase having polyamide 1010 resin as its main component and the solution phase having the polymer B other than the polyamide 1010 resin as its main component, thereby recycling the organic solvent and the polymer B other than the polyamide 1010 resin.

The polyamide 1010 polymer particles become industrially useful material, for example, such that, since they are excellent in particle flowability and stiffness because of their highly spherical forms and high crystallinity and, therefore, they are excellent in smooth touch feeling and long-term quality stability, for example, in the fields of cosmetics and paints and, further, because of their high chemical resistance, by using them as additives for lubricants used for slidable members in an engine and the like, the slidableness can be maintained for a long term while scratches of the slidable members can be suppressed.

DETAILED DESCRIPTION

Figure 1:
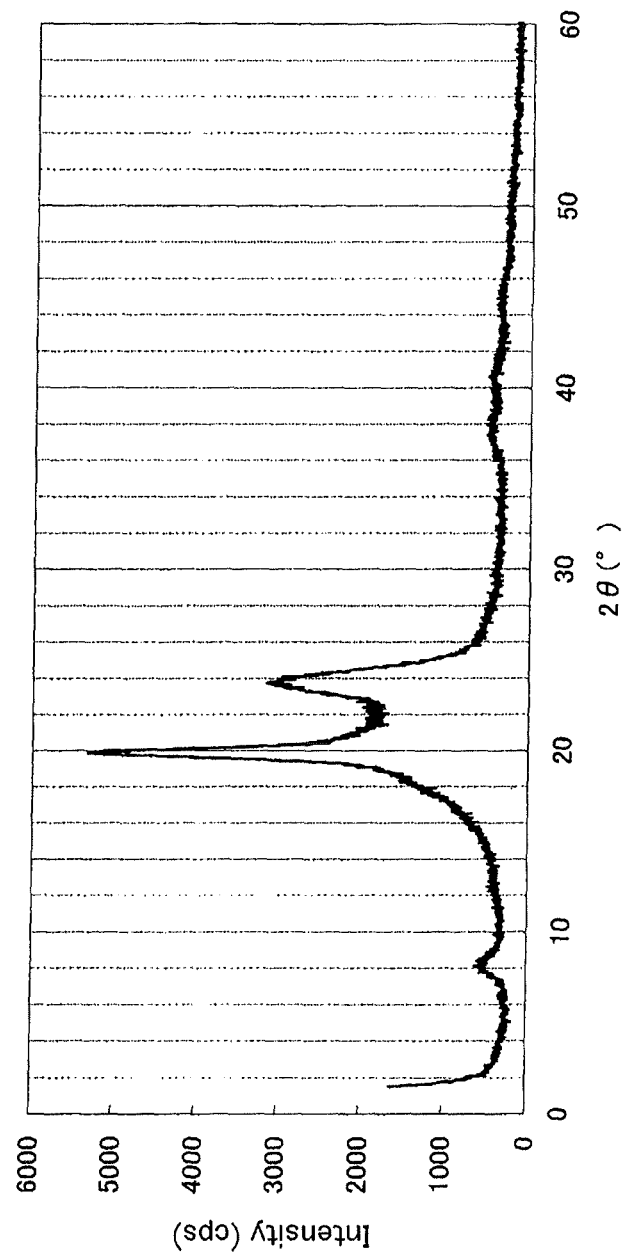
FIG. 1 is an X-ray determination chart of polyamide 1010 polymer particles produced in Example 1.

Hereinafter, our polymer particles and methods will be explained in detail.

Our polyamide 1010 polymer particles are polyamide 1010 polymer particles characterized in that an average particle diameter of the particles is in a range of 1 to 100 μm, and a peak is exhibited at a position of 24 degrees in a spectrum of diffraction angle 2θ determined by wide angle X-ray scattering.

The "polyamide 1010 polymer particles" means particles composed of polyamide 1010 resin. Polyamide 1010 resin means polydecamethylenesebacamide is polymerized with 1,10-decanediamine of an aliphatic diamine and sebacic acid of an aliphatic dicarboxylic acid.

The polyamide 1010 resin can be obtained by a known conventional method, and can be obtained, for example, by melt polymerization or solution polymerization using a salt of the above-described diamine and dicarboxylic acid as a raw material, further, solid phase polymerization using low-molecular polyamide 1010 as a raw material and the like.

Although decanediamine and sebacic acid, which are raw materials, can be obtained by chemical conversion from a raw material originating from petroleum or a raw material originating from biomass, it is not particularly restricted in the present invention, and it is preferred to employ a raw material originating from biomass from the viewpoint of global environmental protection.

Although the degree of polymerization of polyamide 1010 resin is not particularly restricted, from the viewpoint of stiffness of polymer particles to be obtained, as the weight average molecular weight, the lower limit thereof is 1,000 or more, preferably 5,000 or more, more preferably 10,000 or more, further preferably 12,000 or more, and particularly preferably 15,000 or more. Further, the upper limit thereof is 1,000,000 or less, preferably 500,000 or less, more preferably 100,000 or less, further preferably 50,000 or less, and particularly preferably 30,000 or less. Where, the weight average molecular weight is defined as a value converted in terms of polymethacrylic methyl from a value which is determined by gel permeation chromatography (GPC) using hexafluoroisopropanol as a solvent.

The average particle diameter of polyamide 1010 polymer particles 1 µm to 100 µm, and the upper limit is preferably 80 µm or less, more preferably 60 µm or less, further preferably 50 µm or less, and particularly preferably 30 µm or less. Further, the lower limit is 1.0 µm or more, preferably more than 1.0 µm, more preferably 5 µm or more, further preferably more than 5 µm, particularly preferably 10 µm or more, and extremely preferably more than 10 µm.

The average particle diameter of polyamide 1010 polymer particles is defined as a diameter determined by specifying diameters of 100 particles randomly selected from a photograph taken by a scanning electron microscope and calculating the arithmetic average. In the photograph, in case where a particle is not a perfect circle, namely, in such a case where the particle has an ellipse-like shape, the maximum diameter of the particle is employed as its particle diameter. To precisely measure the particle diameter, the measurement of the particle diameter is carried out after enlarging the photograph at a magnification of at least 500 times or more, preferably 1,000 times or more.

Further, in polyamide 1010 polymer particles, it is preferred that the particle diameter distribution of the particles is narrow. The particle diameter distribution can be expressed by a particle diameter distribution index in equation (2) described later. The particle diameter distribution index of polyamide 1010 polymer particles according to the present invention is 3 or less, preferably 2.5 or less, more preferably 2.0 or less, further preferably 1.8 or less, particularly preferably 1.5 or less, and extremely preferably 1.3 or less. Further, although a preferred lower limit thereof is not particularly restricted, theoretically the lower limit is 1 or more.

The polyamide 1010 polymer particles are characterized in a point that the sphericity is high, and it is understood that they exhibit a good flowability because of high sphericity.

Sphericity can be expressed as a value calculated by the following equation (1) after determining long diameters and short diameters of 30 particles randomly selected from a scanning electron microscope photograph, and the closer to 100 it is, the higher the sphericity is.

$$\text{sphericity} = \frac{\sum_{i=1}^{n}(\text{short diameter}/\text{long diameter})}{n} \times 100 \quad [1]$$

where "n" represents the number of measurements (30).

The sphericity of polyamide 1010 polymer particles is 80 or higher, preferably 85 or higher, more preferably 90 or higher, further preferably 95 or higher. Although a preferred upper limit is 100 or lower, usually even if it is 90 or lower, a sufficient effect such as improvement of slidableness and smooth touch feeling can be achieved. If the sphericity is lower than 80, the sphere becomes close to an ellipse shape, and a smooth touch feeling cannot be obtained.

Polyamide 1010 polymer particles are characterized in a point that the crystallinity is very high, and from this feature, they have a feature that the elasticity modulus of the polymer particles is high as compared with the conventional one. It is possible to determine the degree of the highness of the crystallinity by carrying out particle X-ray measurement, and the polyamide 1010 polymer particles have peaks at characteristic positions of 20 degrees and 24 degrees in a spectrum of diffraction angle 2θ determined by wide angle X-ray scattering using a Kα ray of copper atom (Cu).

In particular, the peak at a position of 24 degrees in a spectrum of diffraction angle 2θ determined by wide angle X-ray scattering is a peculiar peak observed when the crystal structure of polyamide 1010 resin has developed, and the polyamide 1010 polymer particles have that peak.

Further, in spite of the developed crystal structure, polyamide 1010 polymer particles have characteristics being good in flowability and being small in repose angle of particles together because the sphericity is high as their shapes.

The repose angle of particles formed from polyamide 1010 polymer particles is 30 degrees or less, preferably 25 degrees or less, more preferably 20 degrees or less, and further preferably 15 degrees or less. Although the lower limit of the repose angle is not particularly restricted, it is greater than 0 degree.

Polyamide 1010 polymer particles are characterized in that, because the crystallinity is high, the mechanical strength is high and the elasticity modulus is high.

The elasticity modulus of the polyamide 1010 polymer particles is 1.6 GPa or more, preferably 1.7 GPa or more, more preferably 1.8 GPa or more, further preferably 1.9 GPa or more, and particularly preferably 2.0 GPa or more.

To determine the elasticity modulus of particle-like material, by using a micro compression testing machine supplied by Shimadzu Corporation and using Hertz's theory of elasticity, the elasticity modulus can be calculated.

Thus, by having a high elasticity modulus, since the application range to slidable members and the like is extended, they become material useful as polymer microparticles.

Polyamide 1010 polymer particles are characterized in a point that, because of the developed crystal structure, light reflection is caused as a reflection originating from the crystal structure in the particle in addition to a reflection at a particle interface, and therefore, in particular, an L value, which represents a lightness determined by spectrophotometry, becomes high.

The L value representing the lightness is preferably 70 or higher, more preferably 80 or higher, and particularly preferably 85 or higher. If the L value is lower than 70, factor of coloring becomes great, and in case being employed in use such as cosmetics and paints, it becomes difficult to create an arbitrary color tone. The preferred upper limit of the L value is 100.

Polyamide 1010 polymer particles are characterized in a point to be spherical with a surface smoothness. The surface smoothness referred to here can be quantified by counting the concavo-convex number capable of being determined by visual observation from a photograph of a surface of a particle obtained by form observation due to a scanning electron microscope photograph. The number counted is preferably 20 or less per one particle, and more preferably 10 or less.

The above-described surface smoothness is defined by determining the concavo-convex numbers of respective 30 particles randomly selected in a region of a scanning electron microscope photograph observed at a magnification of 1,000 to 5,000 times, and calculating an average value thereof.

To produce polyamide 1010 polymer particles having the above-described good properties, the method showing hereinafter can be employed.

A method of producing polyamide 1010 polymer particles is characterized in that an emulsion is formed within a system that causes phase separation into two phases, being a solution phase having polyamide 1010 resin as its main component (hereinafter, also referred to as polyamide 1010 resin solution phase) and a solution phase having a polymer B other than the polyamide 1010 resin as its main component (hereinafter, also referred to as polymer B solution phase), when the polyamide 1010 resin, the polymer B other than the polyamide 1010 resin, and an organic solvent are dissolved and mixed, and thereafter a poor solvent of the polyamide 1010 resin is brought into contact with the emulsion to precipitate the polyamide 1010 resin.

As the polymer B other than the polyamide 1010 resin, although a thermoplastic resin and a thermosetting resin can be exemplified, a thermoplastic resin is preferred from the viewpoint of being able to be dissolved in order to form a solution phase and being easily obtained with a state for separation into two phases, and because the state for separation into two phases is easily obtained, as the polymer B other than the polyamide 1010 resin, it is preferred that its SP value is 20 $(J/cm^3)^{1/2}$ or higher.

If the above-described polymer B other than the polyamide 1010 resin is employed, the phase separation state of polymer B solution and polyamide 1010 resin solution is easily formed, and at the time of precipitation due to a poor solvent described later, because precipitation of the polymer B other than the polyamide 1010 resin hardly occurs, a bad influence is not given to particle formation.

At that time, the SP value of polymer B other than polyamide 1010 resin is preferably 21 $(J/cm^3)^{1/2}$ or higher, more preferably 23 $(J/cm^3)^{1/2}$ or higher, further preferably 25 $(J/cm^3)^{1/2}$ or higher, particularly preferably 28 $(J/cm^3)^{1/2}$ or higher, and extremely preferably 30 $(J/cm^3)^{1/2}$ or higher.

If both of polyamide 1010 resin and polymer B other than polyamide 1010 resin can be dissolved in an organic solvent, it is not restricted, and an upper limit of the difference between SP values thereof is preferably 20 $(J/cm^3)^{1/2}$ or lower, more preferably 15 $(J/cm^3)^{1/2}$ or lower, and further preferably 10 $(J/cm^3)^{1/2}$ or lower.

The SP value referred to here is a value calculated according to Fedor's estimation method based on the coagulation energy density and the molar molecular volume (hereinafter, also referred to as calculation method) ("SP value, base, application and calculation method", Hideki Yamamoto, published by Johokiko Co., Ltd., Mar. 31, 2005).

If the calculation cannot be performed by the above-described method, the SP value is calculated from measurements based on whether it is dissolved in a solvent with a known solubility parameter (hereinafter, also referred to as measurement method), and the calculated value can be used instead ("Polymer Handbook Fourth Edition", J. Brand, published by Wiley, 1998).

In particular, the polymer B other than polyamide 1010 resin is preferably high in affinity with a poor solvent described later, and the index of the affinity can be determined by the solubility into water. With respect to the solubility into water of the polymer B other than polyamide 1010 resin, when solubility of 1 g per 100 g of water at 25° C. is defined as 1 (g/100 g), it is preferably 1 (g/100 g) or greater, more preferably 2 (g/100 g) or greater, further preferably 5 (g/100 g) or greater, particularly preferably 10 (g/100 g) or greater, and extremely preferably 15 (g/100 g) or greater. If it is within this range, the affinity with the poor solvent described later is high, and it functions advantageously in the method of producing polyamide 1010 polymer particles.

As the preferred concrete kinds of polymers for the polymer B other than polyamide 1010 resin, polymers having a hydroxyl group, an ether group, an amide group or a carboxyl group in the molecular structure are preferred.

When the polymer B other than polyamide 1010 resin is concretely exemplified, as the polymer having a hydroxyl group in its molecular structure, exemplified are polyvinyl alcohol groups (such as a fully saponified or a partially saponified poly(vinyl alcohol), poly(vinyl alcohol-ethylene) copolymer groups (such as a fully saponified or a partially saponified poly(vinyl alcohol-ethylene) copolymer); poly (para-vinyl phenol); disaccharides such as maltose, cellobiose, lactose, and sucrose; celluloses and derivatives thereof (such as hydroxyalkyl cellulose (hydroxyethyl cellulose, hydroxypropyl cellulose, ethylhydroxyethyl cellulose, etc.), cellulose, methyl cellulose, ethyl cellulose, carboxymethylethyl cellulose, carboxymethyl cellulose, carboxymethyl cellulose sodium, cellulose ester, chitosan, etc.); polysaccharides and derivatives thereof such as amylase and derivatives thereof, starch and derivatives thereof, dextrin, cyclodextrin, and sodium alginate and derivatives thereof; and others such as gelatin, casein, collagen, albumin, fibroin, keratin, fibrin, carrageenan, chondroitin sulfate, gum arabic, agar, and protein. As the polymer having an ether group in its molecular structure, exemplified are polyalkylene glycol, sucrose fatty acid ester, poly(oxyethylene fatty acid ester), poly(oxyethylene lauric fatty acid ester), poly(oxyethylene glycol mono-fatty acid ester), poly(oxyethylene alkyl phenyl ether), poly(oxyalkyl ether), polyvinyl ether, polyvinyl formal, etc. As the polymer having an amide group in its molecular structure, exemplified are polyvinyl pyrrolidone, aminopoly(acrylic amide), poly(acrylic amide), poly(methacrylic amide), water-soluble nylon such as "AQ nylon" (registered trademark) (A-90, P-70, P-95, T-70; supplied by Toray Industries, Inc.). As the polymer having a carboxyl group in its molecular structure, exemplified are polyacrylic acid, sodium polyacrylate, polymethacrylic acid, sodium polymethacrylate. As others, exemplified are synthetic resins such as polystyrene sulfonic acid, sodium polystyrene sulfonate, polyvinyl pyrrolidinium chloride, poly(styrene-maleic acid) copolymer, polyallyl amine, poly(oxyethylene amine), poly(vinyl pyridine), polyaminosulfone, and polyethylene imine.

They are preferably polyvinyl alcohol groups (such as a fully saponified or a partially saponified poly(vinyl alcohol), or poly(vinyl alcohol-ethylene) copolymer groups such as a fully saponified or a partially saponified poly(vinyl alcohol-ethylene) copolymer), cellulose derivatives (such as carboxymethyl cellulose, hydroxyalkyl cellulose (hydroxyethyl cellulose, hydroxypropyl cellulose, ethylhydroxyethyl cellulose), methyl cellulose, ethyl cellulose, carboxymethylethyl cellulose, carboxymethyl cellulose, carboxymethyl cellulose sodium, cellulose ester, etc.), polyalkylene glycol, sucrose fatty acid ester, poly (oxyethylene alkyl phenyl ether), poly (oxyalkyl ether), polyvinyl pyrrolidone, water-soluble nylon, polyacrylic acid, and polymethacrylic acid. More preferably they are polyvinyl alcohol groups (such as a fully saponified or a partially saponified poly(vinyl alcohol), or poly(vinyl alcohol-ethylene) copolymer groups such as a fully saponified or a partially saponified poly(vinyl alcohol-ethylene) copolymer), cellulose derivatives (such as carboxymethyl cellulose, hydroxyalkyl cellulose (hydroxyethyl cellulose, hydroxypropyl cellulose, ethylhydroxyethyl cellulose), methyl cellulose, ethyl cellulose, carboxymethylethyl cellulose, carboxymethyl cellulose, carboxymethyl cellulose sodium, cellulose ester, etc.), polyalkylene glycol, polyvinyl pyrrolidone, water-soluble nylon, and polyacrylic acid. Particularly preferably they are polyvinyl alcohol groups such as a fully saponified or a partially saponified poly(vinyl alcohol), hydroxyalkyl cellulose such as hydroxyethyl cellulose, hydroxypropyl cellulose, etc., polyalkylene glycol, polyvinyl pyrrolidone, water-soluble nylon, and polyacrylic acid.

As the polymer B other than polyamide 1010 resin in the present invention, remarkably preferably polyvinyl alcohol groups are used. In more detail, the polyvinyl alcohol group means a polymer having a structure represented the following general formula (1) in its molecule.

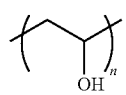

(1)

Although it may be a poly(vinyl alcohol) (a fully saponified or a partially saponified poly(vinyl alcohol). There is also a case where it is called merely as a polyvinyl alcohol.) and a poly(vinyl alcohol-ethylene) (a fully saponified or a partially saponified poly(vinyl alcohol-ethylene)), a polyvinyl alcohol is preferred from the viewpoint of solubility.

The molecular weight of the polymer B other than polyamide 1010 resin is preferably 1,000 to 100,000,000 as weight average molecular weight, more preferably 1,000 to 10,000,000, further preferably 5,000 to 1,000,000, particularly preferably 10,000 to 500,000, and most preferably 10,000 to 100,000.

The weight average molecular weight referred to here is the weight average molecular weight value measured by gel permeation chromatography (GPC) using water as solvent and converted in terms of polyethylene glycol.

Dimethyl formamide is used if water does not serve for the measurement, and tetrahydrofuran is used if measurement is still impossible. If it is still further impossible to make measurements, then hexafluoroisopropanol is used.

With respect to the polyvinyl alcohol group, it is general to produce polyvinyl alcohol by polymerizing vinyl acetate as a raw material and thereafter hydrolyzing it under an alkali condition, and therein usually sodium acetate partially remains as impurities, which is contained around 0.2 mass % even in a product on the market.

We found that the above-described sodium acetate contained in the polyvinyl alcohol influences to some extent, and when an emulsion is formed by dissolving and mixing it into polyamide 1010 resin and an organic solvent, if the temperature is 100° C. or higher, the microparticles are colored, or the recycling property deteriorates by deterioration of the polyvinyl alcohol.

Namely, to stabilize the polyvinyl alcohol group which is polymer B other than polyamide 1010 resin even under a condition for producing microparticles at 100° C. or higher, it is preferred to reduce the amount of sodium acetate existed in the system for forming an emulsion. As a method therefor, it is preferred to use polyvinyl alcohol with a small content of sodium acetate as the polyvinyl alcohol group.

In this case, the amount of sodium acetate in the used polyvinyl alcohol relative to 100 parts by mass of polyvinyl alcohol is 0.1 part by mass or less, preferably 0.05 part by mass or less, more preferably 0.01 part by mass or less.

By controlling it in this range, even if polyamide 1010 resin is made into microparticles under a high-temperature condition, it can be suppressed that the polyvinyl alcohol group is modified originating from decomposition or cross-linking, and making it into microparticles under a high-temperature condition can be stabilized. Further, a preferable lower limit thereof is 0 part by mass.

To obtain polyvinyl alcohol group in little content of sodium acetate, for example, exemplified are a method for washing it by an organic solvent such as methanol or ethanol, a reprecipitation method for producing it by precipitating it in a poor solvent for polyvinyl alcohol group after dissolving it in water and the like, a ultrafiltration method, a method for removing the sodium acetate by ion exchange resin, ion exchange carrier and the like.

Further, as another method of suppressing the influence due to sodium acetate when an emulsion is formed, a method for adding an acid compound to the system of forming the emulsion can be exemplified. By this, a condition where sodium acetate substantially is not contained can be realized.

As the acid compounds, exemplified are aliphatic carboxylic acids such as formic acid, acetic acid, valeric acid, butyric acid, hexanoic acid, heptanoic acid, octanoic acid, acrylic acid, methacrylic acid, crotonic acid, oxalic acid, malonic acid, fumaric acid, maleic acid, glutaric acid, adipic acid, sebacic acid, pyruvic acid, succinic acid and polyacrylic acid, carboxylic acids having a hydroxyl group such as lactic acid, glycolic acid, L-ascorbic acid, erythorbic acid, malic acid, shikimic acid, citric acid, hydrosuccinic acid and tartaric acid, aromatic carboxylic acids such as benzoic acid, 2-fluorobenzoic acid and regioisomers thereof, 2-chlorobenzoic acid and regioisomers thereof, 2-bromobenzoic acid and regioisomers thereof, 2-nitro benzoic acid and regioisomers thereof, 2-toluic acid and regioisomers thereof, phenoxyacetic acid, cinnamic acid, phenyl malonic acid, phthalic acid, terephthalic acid and salicylic acid, amino acids such as glycine, alanine, valine, leucine, isoleucine, serine, threonine, proline, lysin, aspartic acid, glutaminic acid, cysteine, methionine, phenylalanine, tyrosine, histidine, asparagine, glutamine, arginine, tryptophan, ornithine and sarcosine, organic sulfonic acids such as methane sulfonic acid, benzene sulfonic acid, p-toluene sulfonic acid and regioisomers thereof, p-hydroxybenzene sulfonic acid and regioisomers thereof, organic phosphorus acids such as phenyl phosphonic acid, diphenyl phosphinic acid, diphenyl phosphate and 1-naphthyl phosphate, salts consisting of a strong acid and a weak base such as magnesium sulfate, magnesium chloride, ammonium chloride and ammonium sulfate, and inorganic acids such as hydrochloric acid, sulfuric acid, phosphoric acid, nitric acid, pyrophosphoric acid and tripolyphosphoric acid. Those can be used either alone or in combination.

These acid compounds may be added at any step in the production steps described later as long as it is a step before the heating for forming an emulsion is started, and further, they may be used by being added into a raw material in advance.

In that step, with respect to the content of the acid compound, the mole rate of the acid functional group relative to sodium acetate contained in the used polyvinyl alcohol group is preferably 0.1 to 10 times mole, more preferably 0.2 to 8 times mole, and further preferably 0.3 to 5 times mole.

With respect to the content of the acid compound relative to sodium acetate contained in the used polyvinyl alcohol group, in case where the mole rate of the acid functional group is too small, the cross-linking of the polyvinyl alcohol group proceeds, and the particle diameter control ability at the process for making microparticles tends to deteriorate. Further, when the polyvinyl alcohol group is recycled, the particle diameter control ability at the second use or after tends to deteriorate. Furthermore, by color tone change presumed to be caused by oxidation of the polyvinyl alcohol group, a color change of microparticles tends to occur. Further, in case where the mole rate of the acid functional group is too much, by the influence due to acid, oxidation, decomposition or cross-linking of the polyvinyl alcohol group tends to occur.

As the acid compound used in the process, an acid compound having a first dissociation index (pKa1) of 4.5 or less is preferred.

Because the method is carried out at a high temperature of 100° C. or higher, as an acid compound to be used, a compound having a thermally resistant temperature of 100° C. or higher is preferred. The thermally resistant temperature denotes a decomposition temperature of the acid compound.

Specifically, as examples having a thermally resistant temperature of 100° C. or higher and a (pKa1) of 4.5 or less, can be used. In particular, L-ascorbic acid, erythorbic acid, lactic acid, malic acid, fumaric acid, phthalic acid, tartaric acid, formic acid, citric acid, glycolic acid, salicylic acid, maleic acid, malonic acid, glutaric acid, oxalic acid, adipic acid, succinic acid, hydrosuccinic acid, polyacrylic acid, amino acids such as glutaminic acid, aspartic acid, arginine, ornithine, sarcosine, cysteine, serine and tyrosine, and inorganic acids such as hydrochloric acid, sulfuric acid, phosphoric acid, nitric acid, pyrophosphoric acid and tripolyphosphoric acid can be used. In particular, citric acid, tartaric acid, malonic acid, oxalic acid, adipic acid, maleic acid, malic acid, phthalic acid, succinic acid and polyacrylic acid can be preferably used.

pKa is acid dissociation index at 25° C., and denotes a logarithm value of an inverse number of a dissociation constant of an acid compound in an aqueous solution. The pKa value of an acid compound can be referred to by Chemical Handbook (Third revision, Chemical Handbook, Basic version, edited by Chemical Society of Japan, published by Maruzen Co., Ltd. (1984)), etc.

For the pKa value, among the above-described two methods, one described in the Chemical Handbook is preferably employed from the viewpoint of convenience.

The organic solvents that dissolve polyamide 1010 resin and polymer B other than polyamide 1010 resin are organic solvents that can dissolve the polyamide 1010 resin and polymer B other than polyamide 1010 resin to be used, and appropriate ones are selected in accordance with the kind of each polymer.

As concrete examples thereof, exemplified are aliphatic hydrocarbon solvents such as pentane, hexane, heptane, octane, nonane, n-decane, n-dodecane, n-tridecane, cyclohexane, and cyclopentane; aromatic hydrocarbon solvents such as benzene, toluene and xylene; ester solvents such as ethyl acetate and methyl acetate; halogenated hydrocarbon solvents such as chloroform, bromoform, methylene chloride, 1,2-dichloroethane, 1,1,1-trichloroethane, chlorobenzene and 2,6-dichlorotoluene; ketone solvents such as acetone, methyl ethyl ketone, methyl isobutyl ketone and methyl butyl ketone; alcohol solvents such as methanol, ethanol, 1-propanol and 2-propanol; aprotic polar solvents such as N-methyl-2-pyrrolidone, dimethyl sulfoxide, N,N-dimethyl formamide, N,N-dimethyl acetamide, propylene carbonate, trimethyl phosphate, 1,3-dimethyl-2-imidazolidinone and sulfolane; carboxylic acid solvents such as formic acid, acetic acid, propionic acid, butyric acid and lactic acid; ether solvents such as anisole, diethyl ether, tetrahydrofuran, diisopropyl ether, dioxane, diglyme and dimethoxy ethane; and mixtures thereof. The preferable ones are aromatic hydrocarbon solvents, aliphatic hydrocarbon solvents, halogenated hydrocarbon solvents, alcohol solvents, ether solvents, aprotic polar solvents and carboxylic acid solvents.

More preferable solvents are ones having an SP value of $20 \ (J/cm^3)^{1/2}$ or higher. Where, the SP value means a value described in pages 688-701 of "Polymer Handbook Fourth Edition", J. Brand, published by Wiley, 1998.

If not described there, the SP value is calculated based on Fedor's estimation method. This is calculated based on the coagulation energy density and the molar molecular volume (hereinafter, also referred to as calculation method of solvent SP value) ("SP value, base, application and calculation method", Hideki Yamamoto, published by Johokiko Co., Ltd., Mar. 31, 2005).

Specifically, preferable ones are alcohol solvents, aprotic polar solvents and carboxylic acid solvents which are water-soluble solvents, and remarkably preferable ones are aprotic polar solvents and carboxylic acid solvents.

Because forming of the emulsion is carried out at a high temperature of 100° C. or higher, also for the solvent therefor, one having a heat resistance of 100° C. or higher is preferred, and in particular, one having a boiling point of 100° C. or higher at a normal pressure (100 kPa) is preferred. Further, in case where a solvent having a boiling point lower than 100° C. at a normal pressure is used, it is possible to use it by pressurizing it in a pressure-resistant vessel. In consideration of such circumstances and from the points of view that getting is easy and that uniform mixing can be expected with a solvent which is preferably used as a poor solvent such as water or alcohol-group solvent described later, most preferably N-methyl-2-pyrrolidone, dimethyl sulfoxide, N,N-dimethyl formamide, N,N-dimethyl acetamide and 1,3-dimethyl-2-imidazolidinone are used.

Although two or more these organic solvent may be used plurally or as a mixture, the use of a single organic solvent is preferable because they can serve to produce particles with a relatively small particle diameter and with a narrow particle diameter distribution, avoid troublesome separation operations for recycling of used solvents, and decrease the process load for production. Further, it is more preferable to use a single organic solvent that dissolves both polyamide 1010 resin and polymer B other than polyamide 1010 resin.

The poor solvent of polyamide 1010 resin is a solvent that does not dissolve the polyamide 1010 resin. The expression "does not dissolve polyamide 1010 resin" means that the solubility of polyamide 1010 resin in the poor solvent is 1 mass % or less, preferably 0.5 mass % or less, and more preferably 0.1 mass % or less.

Although the production method uses a poor solvent of polyamide 1010 resin, such a solvent is preferably one which is a poor solvent for the polyamide 1010 resin and at the same time a solvent that dissolves the polymer B other than polyamide 1010 resin. By this, polyamide 1010 resin can be efficiently precipitated. Further, it is preferred that the solvent used to dissolve both the polyamide 1010 resin and the polymer B other than polyamide 1010 resin can mix uniformly with the poor solvent for the polyamide 1010 resin.

Although the poor solvent changes depending upon the combination of polyamide 1010 resin and polymer B other than polyamide 1010 resin, as the concrete example, exemplified is at least one solvent selected from the group consisting of aliphatic hydrocarbon solvents such as pentane, hexane, heptane, octane, nonane, n-decane, n-dodecane, n-tridecane, cyclohexane and cyclopentane; aromatic hydrocarbon solvents such as benzene, toluene and xylene; ester solvents such as ethyl acetate and methyl acetate; halogenated hydrocarbon solvents such as chloroform, bromoform, methylene chloride, 1,2-dichloroethane, 1,1,1-trichloroethane, chlorobenzene and 2,6-dichlorotoluene; ketone solvents such as acetone, methyl ethyl ketone, methyl isobutyl ketone and methyl butyl ketone; alcohol solvents such as methanol, ethanol, 1-propanol and 2-propanol; aprotic polar solvents such as dimethyl sulfoxide, N,N-dimethyl formamide, N,N-dimethyl acetamide, trimethyl phosphate, N-methyl-2-pyrrolidone, 1,3-dimethyl-2-imidazolidinone and sulfolane; carboxylic acid solvents such as formic acid, acetic acid, propionic acid, butyric acid and lactic acid; ether solvents such as anisole, diethyl ether, tetrahydrofuran, diisopropyl ether, dioxane, diglyme and dimethoxy ethane; and water.

From the viewpoint of efficiently making polyamide 1010 resin into particles, the preferable ones are aromatic hydrocarbon solvents, aliphatic hydrocarbon solvents, alcohol solvents, ether solvents and water, particularly preferable ones are alcohol solvents and water, and the most preferable one is water.

Since forming the emulsion is carried out at a temperature of 100° C. or higher, in the case where the method is carried out using a solvent having a boiling point lower than 100° C., or in case where, even if the boiling point is 100° C. or higher, the forming of the emulsion is carried out at a temperature of the boiling point or higher, it can be used in a pressure-resistant vessel at a pressurized condition.

It is possible to efficiently precipitate polyamide 1010 resin and obtain polyamide 1010 polymer particles by adequately selecting and combining polymer B other than the polyamide 1010 resin, an organic solvent to dissolve them, and a poor solvent of the polyamide 1010 resin relatively to the polyamide 1010 resin.

The liquid mixed and dissolved with polyamide 1010 resin, polymer B other than the polyamide 1010 resin and an organic solvent that dissolves them must be caused to be phase separated into two phases of a solution phase having polyamide 1010 resin as its main component and a solution phase having the polymer B other than the polyamide 1010 resin as its main component (hereinafter, also referred to as polymer B solution phase). In this step, the organic solvent for the solution phase having polyamide 1010 resin as its main component and the organic solvent for the solution phase having the polymer B other than the polyamide 1010 resin as its main component may be identical with or different from each other, but it is preferred that these solvents are substantially same solvents.

The condition for formation of the two-phase separation state varies depending upon the types of polyamide 1010 resin and polymer B other than the polyamide 1010 resin, the molecular weights of the polyamide 1010 resin and the polymer B other than the polyamide 1010 resin, the type of the organic solvent, the concentrations of the polyamide 1010 resin and the polymer B other than the polyamide 1010 resin, and the temperature and pressure at which the method is to be carried out.

To obtain a condition where phase separation easily takes place, it is preferred that the solubility parameters (hereinafter, also referred to as SP values) of the polyamide 1010 resin and the polymer B other than the polyamide 1010 resin are greatly different from each other.

The difference between both SP values is preferably 1 $(J/cm^3)^{1/2}$ or greater, more preferably 2 $(J/cm^3)^{1/2}$ or greater, further preferably 3 $(J/cm^3)^{1/2}$ or greater, particularly preferably 5 $(J/cm^3)^{1/2}$ or greater, and extremely preferably 8 $(J/cm^3)^{1/2}$ or greater. If the SP values satisfies this range, phase separation can be easily achieved.

There are no specific limitations on the upper limit of the difference between the SP values as long as both the polyamide 1010 resin and the polymer B other than the polyamide 1010 resin can dissolve in the organic solvent, but it is preferred that the upper limit of the difference between the SP values is 20 $(J/cm^3)^{1/2}$ or less, more preferably 15 $(J/cm^3)^{1/2}$ or less, and further preferably 10 $(J/cm^3)^{1/2}$ or less.

The SP value referred to here is a value calculated according to Fedor's estimation method based on the coagulation energy density and the molar molecular volume (hereinafter, also referred to as calculation method) ("SP value, base, application and calculation method", Hideki Yamamoto, published by Johokiko Co., Ltd., Mar. 31, 2005).

If the calculation cannot be performed by this method, the SP value is calculated from measurements based on whether it is dissolved in a solvent with a known solubility parameter (hereinafter, also referred to as measurement method), and the calculated value is used instead ("Polymer Handbook Fourth Edition", J. Brand, published by Wiley, 1998).

Selection of appropriate conditions for phase separation can be determined based on a three-component phase diagram which can be made from a simple preliminary test to observe the states when changing the ratio of the three components of polyamide 1010 resin, polymer B other than the polyamide 1010 resin and the organic solvent to dissolve them.

To prepare the phase diagram, the polyamide 1010 resin, polymer B other than the polyamide 1010 resin and the solvent are mixed and dissolved at an arbitrary ratio, and left at a stationary condition to determine whether an interface is formed. This test is carried out at least at three or more ratios, preferably at five or more ratios, more preferably at 10 or more ratios. By determining the range where two phase separation takes place and the range where only one phase forms, the conditions for desired phase separation can be found.

At that test, to judge whether a phase-separated state can be formed, after the ratio of polyamide 1010 resin, polymer B other than the polyamide 1010 resin and the solvent is controlled at an appropriate ratio at the temperature and pressure where the present invention is to be carried out, the polyamide 1010 resin and the polymer B other than the polyamide 1010 resin are dissolved completely, after the dissolution, the solution is stirred sufficiently, left at a stationary condition for three days, and observed to determine whether phase separation occurs macroscopically. However, in case where a sufficiently stable emulsion is formed, there is a case where macroscopic phase separation does not occur even after being left at a stationary condition for three days. In such a case, the occurrence of phase separation is determined based on microscopic phase separation observation carried out by using an optical microscope or phase contrast microscope.

The phase separation takes place as a result of separation between the polyamide 1010 resin solution phase mainly composed of the polyamide 1010 resin and the polymer B solution phase mainly composed of the polymer B other than the polyamide 1010 resin in the organic solvent. Here, the polyamide 1010 resin solution phase is a phase where mainly polyamide 1010 resin is distributed, and the polymer B solution phase is a phase where mainly polymer B other than the polyamide 1010 resin (hereinafter, referred to as polymer B solution phase) is distributed. The polyamide 1010 resin solution phase and the polymer B solution phase seem to have a volume ratio that depends on the type and amount of the polyamide 1010 resin and the polymer B other than the polyamide 1010 resin.

Each concentration of the polyamide 1010 resin and the polymer B other than the polyamide 1010 resin in the organic solvent is preferably more than 1 mass % and 50 mass % or less relative to the total mass, more preferably more than 1 mass % and 30 mass % or less, and further preferably more than 2 mass % and 20 mass % or less, on the assumption that phase separation can actually take place and that the polymers can actually dissolve in the organic solvent at concentrations in an industrially feasible concentration range.

The interfacial tension between the two phases of the polyamide 1010 resin solution phase and the polymer B solution phase is small because both phases are formed of an organic solvent, and this feature allows the resulting emulsion to be maintained stably, which seems to be a major factor causing a narrow particle diameter distribution. In particular, this effect is remarkable when the same organic solvent is used for the polyamide 1010 resin solution phase and the polymer B solution phase.

The interfacial tension between the two phases is too small to measure directly with the commonly-used hanging-drop method in which a solution is added to another solution to take measurements. The interfacial tension, however, can be estimated from the surface tension of each phase exposed to air. Thus, assuming $r_1$ and $r_2$ represent the surface tension of each phase exposed to air, the interfacial tension $r_{1/2}$ is estimated as an absolute value of $r_{1/2}=r_1-r_2$. The $r_{1/2}$ is preferably in the range of more than 0 mN/m and 10 mN/m or less, more preferably more than 0 mN/m and 5 mN/m or less, further preferably more than 0 mN/m and 3 mN/m or less, and particularly preferably more than 0 mN/m and 2 mN/m or less.

Using the system to be caused with phase separation thus obtained, liquid phases caused with phase separation are mixed to form an emulsion, and thereafter, by bringing a poor solvent into contact therewith, polyamide 1010 polymer particles are produced.

To make microparticles, the steps of forming an emulsion and bringing a poor solvent into contact therewith (hereinafter, also referred to as a step for making microparticles) are carried out in a usual reaction vessel.

In the method of producing polyamide 1010 polymer particles, from the viewpoint of easiness of forming an emulsion by an industrial operation, the temperature of forming the emulsion is 100° C. or higher. Although the upper limit is not particularly restricted as long as it is a temperature at which the polyamide 1010 resin and the polymer B other than the polyamide 1010 resin can dissolve, phase separation is caused and polyamide 1010 polymer particles can be obtained, it is usually 100° C.-300° C., preferably 100° C.-280° C., more preferably 20° C.-260° C., further preferably 20° C.-240° C., particularly preferably 20° C.-20° C., and most preferably 20° C.-200° C.

As polyamide 1010 polymer particles, there is a case where particles with a narrower particle diameter distribution are required from the viewpoint of improving the material characteristics.

For such a requirement, a temperature control at the step of bringing a poor solvent into contact (step for making microparticles) following formation of an emulsion is effective, and the temperature is usually 100° C.-300° C., preferably 100° C.-280° C., more preferably 20° C.-260° C., further preferably 20° C.-240° C., particularly preferably 20° C.-20° C., and most preferably 20° C.-200° C. In particular, from the viewpoint of easiness of management of processes of production, the same temperature as that for forming the emulsion is preferred.

For polyamide 1010 polymer particles, there is a case where it is required to design the surface shape of the particles in accordance with the circumstances at which the particles are used, the control of the surface shape is important particularly in order to improve the flowability of the particles, to improve the sliding ability of the particles, and to improve the touch feeling thereof, and there is a case where microparticles not only having a narrow particle distribution but also having a high sphericity are required.

Toward such a requirement, to make the shape of the particles spherical, it can be made spherical at a high level by controlling the temperatures at the step for forming an emulsion and at the step of making microparticles as follows.

Namely, by carrying out the steps of forming an emulsion and bringing a poor solvent into contact therewith at a temperature higher than the cooling crystallization temperature that is a thermal property of the polyamide 1010 resin and by making microparticles, the particle diameter distribution can be made narrower, and microparticles made in sphere at a higher level can be obtained.

The cooling crystallization temperature means a crystallization temperature determined by a method of differential scanning calorimetry (DSC), and denotes a peak top of an exothermic peak observed when, after the polymer is once heated from 30° C. to a temperature higher than the melting point of the polymer by 30° C. at a temperature elevation speed of 20° C./min., it is kept for one minute, and thereafter, it is cooled down to 0° C. at a temperature lowering speed of 20° C./min.

The suitable pressure to carry out the method, from the viewpoint of industrial realization, is normal pressure to 100 atm (10.1 MPa), preferably 1 atm (101.3 kPa) to 50 atm (5.1 MPa), more preferably 1 atm (101.3 kPa) to 30 atm (3.0 MPa), particularly preferably 1 atm (101.3 kPa) to 20 atm (2.0 MPa).

The step of making microparticles is carried out in a high temperature range as the case may be, carried out under a high pressure condition, and it is in a condition where thermal decomposition of the polyamide 1010 resin, the polymer B other than the polyamide 1010 resin or the organic solvent is liable to be accelerated and, therefore, it is preferred to carry out it at a condition where the oxygen concentration is as low as possible. The oxygen concentration of the atmosphere in the reaction vessel is preferably 5 vol. % or less, more preferably 1 vol. % or less, further preferably 0.1 vol. % or less, still further preferably 0.01 vol. % or less, and particularly preferably 0.001 vol. % or less.

Because the measurement of a very small oxygen concentration is substantially difficult, the oxygen concentration is to be theoretically calculated from the capacity of the reaction vessel, the oxygen volume concentration of an inert gas, the substituted pressure in the vessel and the times thereof.

Further, for the reaction vessel, it is preferred to use an inert gas. Concretely, nitrogen, helium, argon and carbon dioxide can be used, and preferably, it is nitrogen or argon.

Further, from the viewpoint of preventing deterioration due to oxidation of the raw material used for making microparticles, an antioxidant may be used as an additive.

As the antioxidant, because it is added for the purpose of trapping the radical, exemplified are phenolic antioxidant, sulfuric antioxidant, aromatic amine antioxidant, phosphoric antioxidant, etc.

As concrete examples of the antioxidant, exemplified are phenol, hydroquinone, p-methoxy phenol, benzoquinone, 1,2-naphthoquinone, cresol, catechol, benzoic acid, hydroxyl benzoic acid, salicylic acid, hydroxyl benzene sulfonic acid, 2,5-di-t-butyl hydroquinone, 6-t-butyl-m-cresol, 2,6-di-t-butyl-p-cresol, 4-t-butyl catechol, 2,4-dimethyl-6-t-butyl phenol, 2-t-butyl hydroquinone, 2-t-butyl-4-methoxy phenol, etc.

Although the concentration of the antioxidant is not particularly restricted, it is preferably 0.001-10 mass % relative to the mass of the polymer B other than polyamide 1010 resin, more preferably 0.01-5 mass %, and most preferably 0.05-3 mass %.

An emulsion is formed by mixing respective phases together under such a condition. Namely, an emulsion is produced by adding a shear force to the phase-separation solution obtained as described above.

The microparticles produced by the above-described production process have a very narrow particle diameter distribution. This is because a more uniform emulsion can be obtained by carrying out the forming of the emulsion at a high temperature as compared with one where the forming is not carried out at a high temperature.

Therefore, to obtain a sufficient shear force to form an emulsion, stirring due to a generally known method can serve sufficiently, the mixing can be achieved by a known method such as liquid phase stirring using stirring blades, stirring in a continuous twin mixer, mixing in a homogenizer, ultrasonic irradiation, etc.

In particular, in case of stirring using stirring blades, although it is depending upon the shape of the stirring blades, the stirring speed is preferably 50 rpm to 1,200 rpm, more preferably 100 rpm to 1,000 rpm, further preferably 200 rpm to 800 rpm, and particularly preferably 300 to 600 rpm.

As the stirring blades, concretely, exemplified are types of propeller, paddle, flat paddle, turbine, double cone, single cone, single ribbon, double ribbon, screw, and helical ribbon, but, the stirring blades are not particularly limited thereto as long as a shear force can be sufficiently applied to the system. Further, to perform efficient stirring, baffle plates or the like may be provided in the vessel.

Further, to produce an emulsion, in addition to stirrers, widely known devices such as emulsifying machine and dispersion machine may be used. As concrete examples, exemplified are batch-type emulsifying machines such as Homogenizer (supplied by IKA Corporation), Polytron (supplied by Kinematica, Inc.), and T. K. Autohomomixer (supplied by Tokushu Kika Kogyo Co., Ltd.), and others such as Ebara Milder (supplied by Ebara Corporation), T. K. Filmics (supplied by Tokushu Kika Kogyo Co., Ltd.), T. K. Pipeline Homomixer (supplied by Tokushu Kika Kogyo Co., Ltd.), Colloid Mill (supplied by Shinko-Pantec Co., Ltd.), and Slusher, Trigonal Wet Grinder (supplied by Mitsui Miike Kakoki Co., Ltd.), as well as ultrasonic homogenizers and static mixers.

The emulsion thus obtained is subsequently subjected to a step of precipitating microparticles.

To obtain polyamide 1010 polymer particles, a poor solvent for the polyamide 1010 resin is brought into contact with the emulsion produced by the above-described step to precipitate microparticles having a diameter in correspondence with that of the emulsion.

The contact between the poor solvent and the emulsion may be achieved by either pouring the emulsion in the poor solvent, or pouring the poor solvent in the emulsion, but it is preferable to pour the poor solvent in the emulsion.

The method of pouring the poor solvent is not particularly restricted as long as the polyamide 1010 polymer particles can be obtained, and any of continuous dropping method, split dropping method and batch addition method may be employed. However, continuous dropping method and split dropping method are preferably employed because they can prevent coagulation, fusion or coalescence of the emulsion from being caused when adding the poor solvent, which may lead to a large particle diameter distribution or bulky grains larger than 1,000 μm, and to industrially perform it efficiently, the most preferable method is continuous dropping method.

Further, the time of adding the poor solvent is within 10 minutes to 50 hours, preferably within 30 minutes to 10 hours, and more preferably within 1 hour to 5 hours.

If it is carried out within a shorter time than these ranges, the emulsion will be likely to undergo coagulation, fusion, or coalescence, which may lead to a large particle diameter distribution or bulky grain. Further, the performance of the addition for a longer time than the above-described ranges is not practical in consideration of industrial performance.

Implementation within these time ranges serves to suppress coagulation among particles when the emulsion is converted to polyamide 1010 polymer particles, and to produce polyamide 1010 polymer particles with a narrow particle diameter distribution.

Although depending upon the state of the emulsion, the amount of the poor solvent to be added is preferably from 0.1 to 10 parts by mass, more preferably 0.1 to 5 parts by mass, further preferably 0.2 to 3 parts by mass, particularly preferably 0.2 to 2 parts by mass, and most preferably 0.2 to 1.0 part by mass, relative to the total amount of 1 part by mass of the emulsion.

Although the time of the contact between the poor solvent and the emulsion may be a sufficient time for precipitation of microparticles, to cause sufficient precipitation and obtain an efficient productivity, it is preferably 5 minutes to 50 hours, more preferably 5 minutes to 10 hours, further preferably 10 minutes to 5 hours, particularly preferably 20 minutes to 4 hours, most preferably 30 minutes to 3 hours, following the completion of the addition of the poor solvent.

Powder of the microparticles can be collected by subjecting the dispersion liquid of the polyamide 1010 polymer particles thus obtained to solid-liquid separation achieved by a generally known method such as filtration, reduced pressure filtration, compression filtration, centrifugal separation, centrifugal filtration, spray drying and the like.

The polyamide 1010 polymer particles obtained from the solid-liquid separation are purified by washing them in a solvent or the like as needed to remove impurities that are carried on the surface or contained.

The method has the advantage that it is possible to recycle the organic solvent and the polymer B other than polyamide 1010 resin separated in the solid-liquid separation step carried out to produce powder of microparticles for again utilizing them.

With respect to the recycling, it becomes a factor in continuing a stable production that change of substances of the organic solvent and the polymer B other than polyamide 1010 resin is suppressed in a series of steps for producing microparticles. By applying the method, because change of the polymer B other than polyamide 1010 resin, which has been a problem, can be suppressed, even if the organic solvent and the polymer B other than polyamide 1010 resin are recycled, an advantage can be obtained wherein a stable production becomes possible without quality change in each production batch.

The solvent resulting from the solid-liquid separation is a mixture of the polymer B other than polyamide 1010 resin, the organic solvent and the poor solvent. By removing the poor solvent from this mixture, the remaining liquid can be recycled as the solvent for forming the emulsion. Removal of the poor solvent is carried out by a generally known method, concretely, simple distillation, reduced pressure distillation, precision distillation, thin film distillation, extraction, membrane separation and the like can be exemplified, and preferably, simple distillation, reduced pressure distillation or precision distillation is employed.

When distillation operation such as simple distillation or reduced pressure distillation is performed, because heat is applied to the system similarly in the production of polyamide 1010 polymer particles and there is a possibility that heat decomposition of the polymer B other than polyamide 1010 resin or the organic solvent is promoted, it is preferably performed in an oxygen-free state, more preferably in an inert atmosphere. Concretely, it is carried out preferably under a condition of nitrogen, helium, argon, or carbon dioxide. Further, a phenolic compound may be again added as an antioxidant.

For recycling, it is preferred that the poor solvent is removed as much as possible. Concretely, the amount of the remaining poor solvent is 10 mass % or less, preferably 5 mass % or less, more preferably 3 mass % or less, and particularly preferably 1 mass % or less, relatively to the total amount of the organic solvent and the polymer B to be recycled. In case where the remaining amount is over this range, because the particle diameter distribution of the polyamide 1010 polymer particles becomes broader, or the particles are coagulated, such a condition is not preferred.

The content of the poor solvent in the solvent mixture used for recycle can be measured by a generally known method such as gas chromatography or the Karl Fischer's method.

In practice, since loss of the organic solvent or the polymer B other than polyamide 1010 resin may take place during the operations for removing the poor solvent, it is preferred to appropriately adjust the composition ratio to the initial ratio.

Thus, in our polyamide 1010 polymer particles, as compared to the polyamide 1010 polymer particles obtained by conventional methods, because the particle flowability is excellent, a smooth touch feeling can be obtained, and because the crystallinity of polyamide 1010 resin is high, the lightness is high and, further, because the surface smoothness and the sphericity are high, they can be suitably used in the fields of cosmetics and or the fields of modifiers for paints.

From these, the polyamide 1010 polymer particles obtained our methods can be utilized extremely usefully and practically in various industrial uses. Concretely, they can be utilized for uses such as skin care agents such as face wash, sunscreens, cleansing agents, cosmetic water, lotions, cosmetic liquid, creams, cold creams, aftershave lotions, shaving soaps, oil absorbing sheets and matifiants; cosmetics and modifiers thereof such as foundations, foundation powder, face powder in liquid form, mascara, face powder, Dohran, eyebrow pencil, eye line, eye shadow, eye shadow base, nose shadow, lipsticks, gloss, cheek brushes, tooth wax, manicure and topcoat; additives for hair care products such as shampoo, dry shampoo, conditioner, rinse, shampoo containing rinse ingredients, treatment, hair tonic, hair conditioner, hair oil, pomade and hair color agent; additives for amenity products such as perfume, cologne water, deodorant, baby powder, tooth powder, mouthwash, lip balm and soap; rheology improving agents such as an additive for toner and paint; diagnostic test agents for medical purpose; mechanical property improving agents for molded products such as car materials and building materials; mechanical property improving materials such as film and fiber; raw materials for molding resin such as rapid prototyping and rapid manufacturing; flash-moldable materials; paste resins for plastic sol; powder blocking agent; powder flowability improving agent; lubricant; rubber compounding ingredient; polishing agent; viscosity improver; filter material and filter aid; gelatinizer; coagulant; additives for paints; oil absorbent; mold releasing agent; various modifiers such as improving slidableness agent for plastic films/sheets, anti-blocking agent, gloss adjusting agent, frosted finish agent, light diffusion agent, surface hardness improving agent and ductility improving material; spacer for liquid crystal display equipment; filler for chromatography; base material/additive for cosmetic foundation; assistant for micro-capsules; medical materials for drug delivery system/diagnostic reagents; support agent for perfume/pesticide; catalyst/carrier for chemical reactions; gas adsorbent; sintered material for ceramic processing; standard particle materials for measurement/analysis; particles for food manufacture industry; material for powder coating; and toner for electrophotographic development.

Further, the polyamide 1010 polymer particles composed of polyamide 1010 resin produced from a material originating from biomass have a possibility to substitute traditionally used polymer microparticles because they have characteristics as low environmental load materials. As concrete uses for the above-described resin molded products, films, fibers and the like, for example, exemplified are electric/electronic parts represented by a housing of electric equipment, a housing of OA equipment, various kinds of covers, various kinds of gears, various kinds of cases, a sensor, an LED lamp, a connector, a socket, a resistor, a relay case, a switch, various kinds of terminal boards, a plug, a printed wiring board, a tuner, a speaker, a microphone, headphones, a small size motor, a magnetic head base, a power module, a housing, a semiconductor, a liquid crystal, an FDD carriage, an FDD chassis, a motor brush holder, a parabolic antenna, computer connection parts, etc.; home and office electric appliance parts represented by TV parts, irons, hair dryers, rice cooker parts, microwave oven parts, acoustic equipment parts, audio equipment parts such as an audio, a laser disc (a registered trademark) and a compact disk, image equipment-related parts such as a camera, a VTR, a picture-taking lens such as a projection TV, a finder, a filter, a prism and Fresnel lens, illumination parts, refrigerator parts, air-conditioner parts, typewriter parts and word processor parts; information appliance-related parts represented by an office computer-related part, a telephone-related part, a facsimile-related part, a copier-related part, films to protect various kinds of disc boards, an optical disc player pick-up lens, an optical fiber, an optical switch, an optical connector and the like; parts represented by a liquid crystal display, a flat-panel display, light guiding panel for plasma display, a Fresnel lens, a polarizing plate, a polarizing plate protection film, a phase difference film, a light diffusion film, a visual field angle expansion film, a reflection film, a reflection prevention film, an anti-glare film, a brightness improving film, a prism sheet, a light guiding film for touch panel and the like; machine-related parts represented by a jig for washing, a motor part, a lighter, a typewriter and the like; optical equipment represented by microscopes, binoculars, clocks, and the like; and precision instrument-related parts, various kinds of pipes for fuel, exhaust and intake systems, an air intake nozzle snorkel, an intake manifold, a fuel pump, a connector for fuses, a horn terminal, an insulation board for electric equipment parts, a lamp socket, a lamp reflector, a lamp housing, an engine oil filter, an ignition device case and the like, and the particles are remarkably useful for such various uses.

EXAMPLES

Hereinafter, our polymer particles and methods will be explained in detail base on examples, but this disclosure is not limited to these examples.

(1) Methods of Measuring Average Particle Diameter and Particle Diameter Distribution:

Each particle diameter of polyamide 1010 polymer particles (hereinafter, referred to as "particle(s)") was determined from observation made by scanning electron microscopy (with JSM-6301NF scanning electron microscope, supplied by JEOL Ltd.) at a magnification of 1,000 times. Long diameter of the particle was determined as the particle diameter if the shape of the particle was not a perfect circle. The average particle diameter was determined by measuring the diameters of 100 randomly selected particles in scanning electron microscope photographs and calculating their arithmetic average.

The particle diameter distribution index, which represents the particle diameter distribution, was calculated from the diameter of each particle measured above according to the following conversion equation (2).

$$Dn = \sum_{i=1}^{n} Ri/n \qquad [2]$$

$$Dv = \sum_{i=1}^{n} Ri^4 / \sum_{i=1}^{n} Ri^3$$

$$PDI = Dv/Dn$$

In the equation, Ri represents diameter of each particle, n represents the number of measurements (100), Dn represents the number average particle diameter, Dv represents the volume average particle diameter, and PDI represents the particle diameter distribution index.

(2) Method of Determining Wide Angle X-Ray Diffraction Spectrum:

X-ray diffraction spectrum was determined using "RINT2100, Ultima/PC"; supplied by Rigaku Corporation. The determination conditions are as follows.

X-ray source: Copper, $K\alpha$ ray
Tube voltage: 40 kV
Tube current: 30 mA
Wavelength: 1.54 Å
Scan rate: 3.0°/min
Divergence slit: 1°
Scattering slit: 1°
Receiving slit: 0.15 mm (3) Determination of Sphericity:

The sphericity is determined by observing particles by a scanning electron microscope and measuring the long diameters and short diameters, and calculating it from the average of 30 particles randomly selected based on the aforementioned equation (1). In the aforementioned equation (1), the number of measurements is 30.

(4) Estimation of Surface Smoothness:

Particles were observed by scanning electron microscopy (with JSM-6301NF scanning electron microscope, supplied by JEOL Ltd.) at a magnification of 1,000 times, and the surface smoothness was determined by observation with the following ranks from the observation photographs of the surfaces of the obtained particles.

A: The surface is smooth and there are almost no concavo-convexes.

B: Although the surface is smooth, there are 10 or less concavo-convexes per one particle.

C: On the surface, there are concavo-convexes of more than 10 per one particle.

D: The surface is not smooth.

(5) Estimation of Particle Flowability:

As the estimation of particle flowability, the repose angle was determined. The method for determining the repose angle was carried out by naturally dropping 5 g of particles from a position at a height of 6 cm relative to a horizontal plane using a funnel, depositing the particles on the horizontal plane, and determining the repose angle by an injection method for measuring the angle formed between the horizontal plane and the ridge line of the particles. The higher the repose angle is, the poorer the particle flowability is, and particles having a small repose angle are excellent in flowability. When the repose angle was 25 degrees or less, the particle flowability was determined to be good.

(6) Estimation of Stiffness of Particles:

Using a micro compression testing machine "MCTW-500" supplied by Shimadzu Corporation, the elasticity modulus of the particles was determined in a standard room at a room temperature of 23° C. and a humidity of 50% RH under a condition of a diamond plane indenter ($\phi$=50 μm) and a loading velocity of 0.3847 mN/s in a loading velocity constant system.

As to the calculation of elasticity modulus of particles, to remove the influences due to a stage of the testing machine and the indenter, it was calculated from $E_1$, which was an elasticity modulus of particles, using the following equations 3 and 4.

$E_1$: elasticity modulus of particles (GPa)
$E_2$: elasticity modulus of the machine indenter (1140 GPa)
$E_3$: elasticity modulus of the machine stage (200 GPa)
$v_1$: Poisson's ratio of particles (set at 0.4)
$v_2$: Poisson's ratio of the machine indenter (0.07)
$v_3$: Poisson's ratio of the machine stage (0.3)
$\delta$: compressive displacement magnitude at the time of particle compression (μm)
$E^*$: complex elasticity modulus with an object to be determined (GPa)
$R_1$ radius of particle (μm)
$P$: load (mN)

$$\delta^3 = \frac{9}{16R_1} E^* P^2 \quad [3]$$

$$E^* = \left[ \left( \frac{1-v_1^2}{E_1} + \frac{1-v_2^2}{E_2} \right)^{\frac{2}{3}} + \left( \frac{1-v_1^2}{E_1} + \frac{1-v_3^2}{E_3} \right)^{\frac{2}{3}} \right]^3 \quad [4]$$

The elasticity modulus was calculated using a deformation range of 1-5% of a particle diameter that was an elastic deformation range.

(7) Bulk Density:

Particles were softly filled into a graduated cylinder of 10 ml, the weight of the particles in the graduated cylinder was measured, and the mass per unit volume was determined as the bulk density.

(8) Touch Feeling:

Using the obtained particles, a sensory test due to 8 panels was carried out. The estimation method was carried out by a sensory test with respect to three items of "foreign material feeling", "softness" and "smoothness" wherein a small amount of particles (about 0.02 g) were put on the back of a hand, and the particles were scrubbed by three fingers of another hand. With respect to the respective items, the average points of eight persons when the following rank points were allotted were ranked in accordance with the following standards.

"Foreign Material Feeling"
 3 point: There is no foreign material feeling.
 2 point: There is slightly foreign material feeling.
 1 point: There is foreign material feeling.
"Softness"
 3 point: soft feeling
 2 point: slightly soft feeling
 1 point: hard feeling
"Smoothness"
 3 point: smooth
 2 point: slightly smooth
 1 point: There is a catching feeling.
<Determination Standards>
 9.0-6.5 point: ○
 6.4-4.5 point: △
 4.4-3.0 point: x (9) Measurement of Lightness:

Using a spectrophotometry "SE-2000" supplied by Nippon Denshoku Industries Co., Ltd., the lightness L was measured. As the standard, a standard white board attached to the equipment (y=95.99, x=94.04, z=113.10) was used.

(10) Quantitative Analysis of Sodium Acetate Contained in Polyvinyl Alcohol Group:

It was determined by sodium acetate dissolution and titration method described in JIS "method for testing polyvinyl alcohol" (10726 (1994)).

Reference Example 1 Washing 1 of Sodium Acetate in Polyvinyl Alcohol Group 50 g of polyvinyl alcohol (supplied by Nippon Synthetic Chemical Industry Co., Ltd., G-type "Gohsenol" (registered trademark) GM-14, weight average molecular weight: 29,000, SP value: 32.8 $(J/cm^3)^{1/2}$, content of sodium acetate: 0.23 mass %) and 500 ml of methanol were added in a 1 L round bottom flask, and stirred under a room temperature condition for one hour. Thereafter, the solution was filtrated by suction filtration (filter paper 5A, 90 mmφ). Following thereto, the same operation was repeated two times, totally three times, and then, by drying it at 80° C. for 10 hours, polyvinyl alcohol little with content of sodium acetate was obtained. The quantified sodium acetate in the obtained polyvinyl alcohol was 0.05 mass %.

Figure 7:
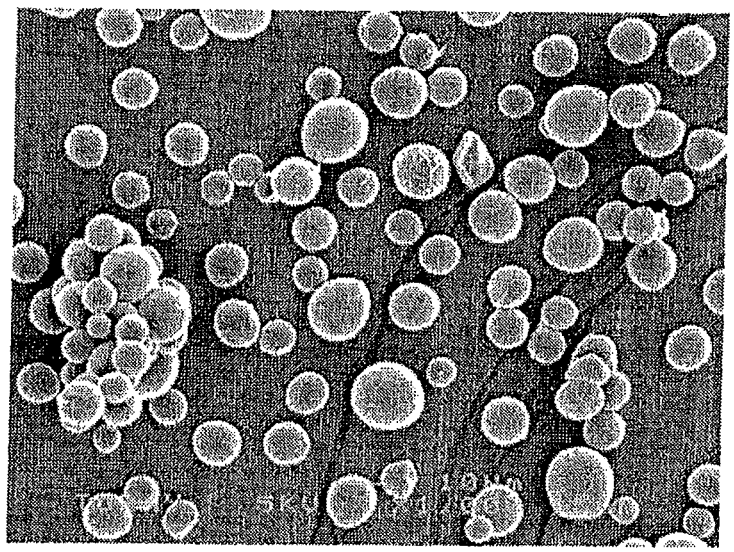
FIG. 7 is a diagram showing the result of observing polyamide 1010 polymer particles produced in Example 1 by a scanning electron microscope at a magnification of 1,000 times.

Example 1 Method for Producing Polyamide 1010 Polymer Particles 24.5 g of polyamide 1010 (weight average molecular weight: 22,500, "Hiprolon" (registered trademark) -200, supplied by Hipro Polymers Co. Ltd.), 273.5 g of N-methyl-2-pyrrolidone as the organic solvent and 42 g of polyvinyl alcohol little with content of sodium acetate prepared in Reference Example 1 as the polymer B other than polyamide 1010 resin (weight average molecular weight: 29,000, SP value: 32.8 $(J/cm^3)^{1/2}$) were added into a 1,000 ml pressure resistant glass autoclave (supplied by Taiatsu Techno Corporation, Hyper Glaster, TEM-V1000N), after replaced with nitrogen of 99 volume % or more, heated up to 180° C., and stirred for 2 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 110 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 24.0 g of white solid material. When the obtained powder were observed by a scanning electron microscope, they were polyamide 1010 polymer particles having a true sphere-like particle shape (FIG. 7), an average particle diameter of 7.5 μm, and a particle diameter distribution index of 1.12. When wide angle X-ray diffraction spectrum was determined for the polyamide 1010 polymer particles, as diffraction angle 2θ, peaks were exhibited at positions of 20 degrees and 24 degrees (FIG. 1). Where, the melting point of the polyamide 1010 used in this Example was 207° C., the heat of fusion was 29.0 J/g, and the cooling crystallization temperature was 144° C. The SP value determined by the calculation method was 22.47 $(J/cm^3)^{1/2}$. Further, the estimated value of the interfacial tension of this system was 2 mN/m or less. The solubility (room temperature) of polyamide relative to water, which was the poor solvent, was 0.1 mass % or less.

The estimation results of the properties of the obtained polyamide 1010 polymer particles were shown in Table 1.

The polyamide 1010 polymer particles according to this Example had a true sphere-like shape, and were excellent in surface smoothness and excellent in particle flowability.

When the molecular weight of polyvinyl alcohol in the filtrated solution after finishing to make particles was determined, the weight average molecular weight was 28,500, and it almost did not change from the value before being used.

Figure 2:
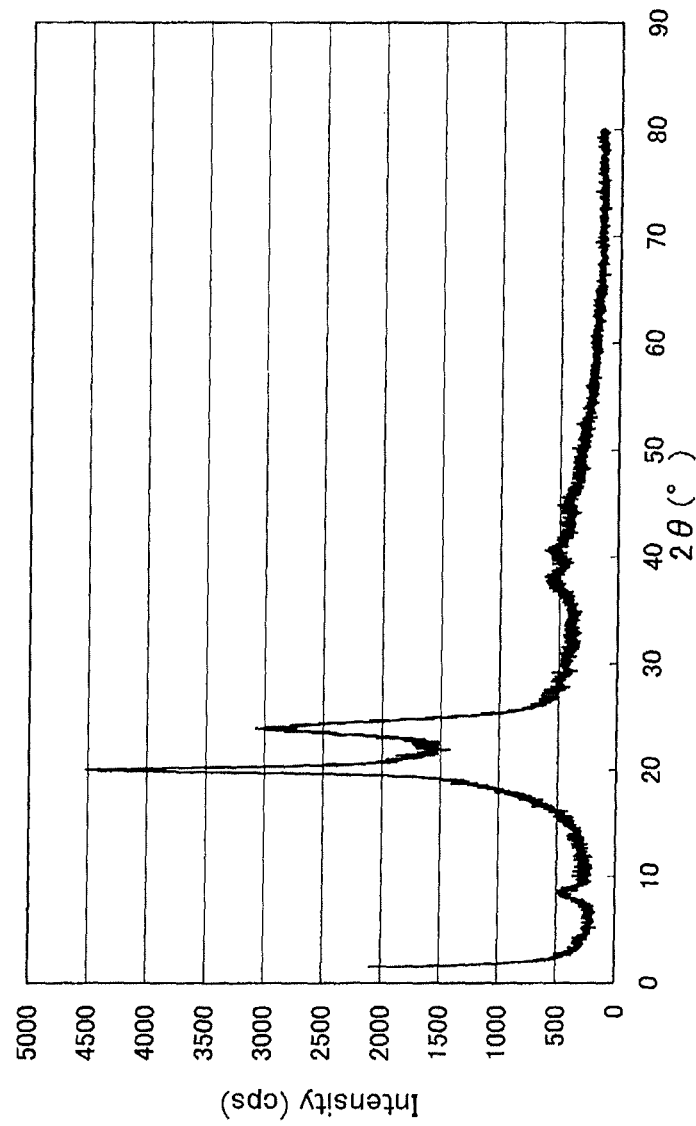
FIG. 2 is an X-ray determination chart of polyamide 1010 polymer particles produced in Example 2.
Figure 8:
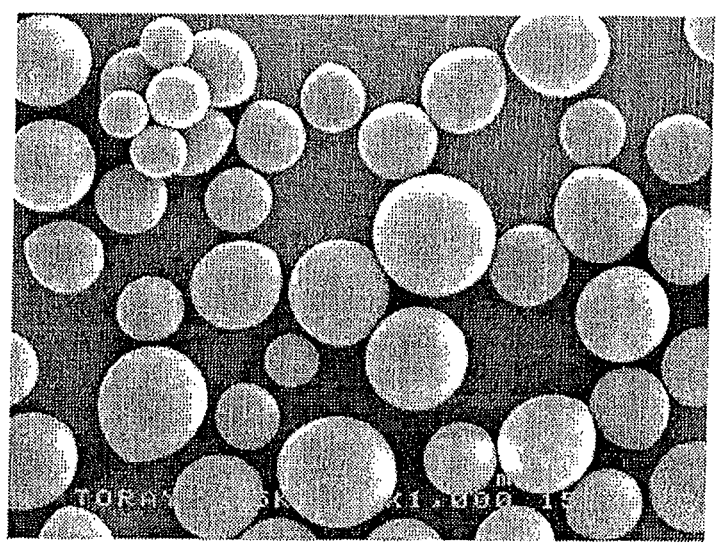
FIG. 8 is a diagram showing the result of observing polyamide 1010 polymer particles produced in Example 2 by a scanning electron microscope at a magnification of 1,000 times.

Example 2 Method for Producing Polyamide 1010 Polymer Particles by Adding Acid 35 g of polyamide 1010 (weight average molecular weight: 22,500, "Hiprolon" (registered trademark) -200, supplied by Hipro Polymers Co. Ltd.), 273 g of N-methyl-2-pyrrolidone as the organic solvent and 42 g of polyvinyl alcohol as the polymer B other than polyamide 1010 resin (supplied by Nippon Synthetic Chemical Industry Co., Ltd., "Gohsenol" (registered trademark) GH-20, weight average molecular weight: 44,600, SP value: 32.8 $(J/cm^3)^{1/2}$), and 0.21 g of L-tartaric acid were added into a 1,000 ml pressure resistant glass autoclave (supplied by Taiatsu Techno Corporation, Hyper Glaster, TEM-V1000N), after replaced with nitrogen of 99 volume % or more, heated up to 180° C., and stirred for 3 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 80 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 34.5 g of white solid material. When the obtained powder were observed by a scanning electron microscope, they were polyamide 1010 polymer particles having a true sphere-like particle shape (FIG. 8), an average particle diameter of 15.8 μm, and a particle diameter distribution index of 1.14. When wide angle X-ray diffraction spectrum was determined for the polyamide 1010 polymer particles, as diffraction angle 2θ, peaks were exhibited at positions of 20 degrees and 24 degrees (FIG. 2). The melting point of the polyamide 1010 used in this Example was 207° C., the heat of fusion was 29.0 J/g, and the cooling crystallization temperature was 144° C. Further, the estimated value of the interfacial tension of this system was 2 mN/m or less. The solubility (room temperature) of polyamide relative to water, which was the poor solvent, was 0.1 mass % or less.

The estimation results of the properties of the obtained polyamide 1010 polymer particles were shown in Table 1. The polyamide 1010 polymer particles according to this Example had a true sphere-like shape, and were excellent in surface smoothness and excellent in particle flowability and stiffness.

When the molecular weight of polyvinyl alcohol in the filtrated solution after finishing to make particles was determined, the weight average molecular weight was 45,000, and it almost did not change from the value before being used.

Figure 3:
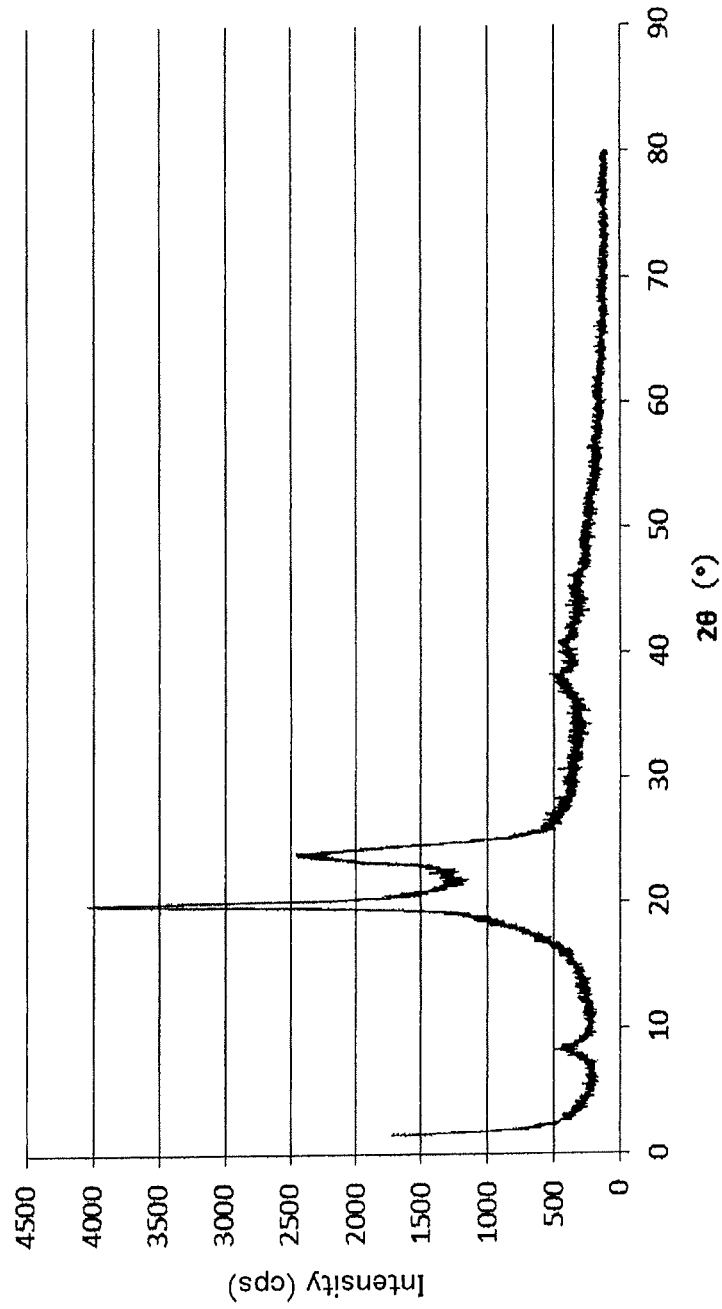
FIG. 3 is an X-ray determination chart of polyamide 1010 polymer particles produced in Example 3.
Figure 9:
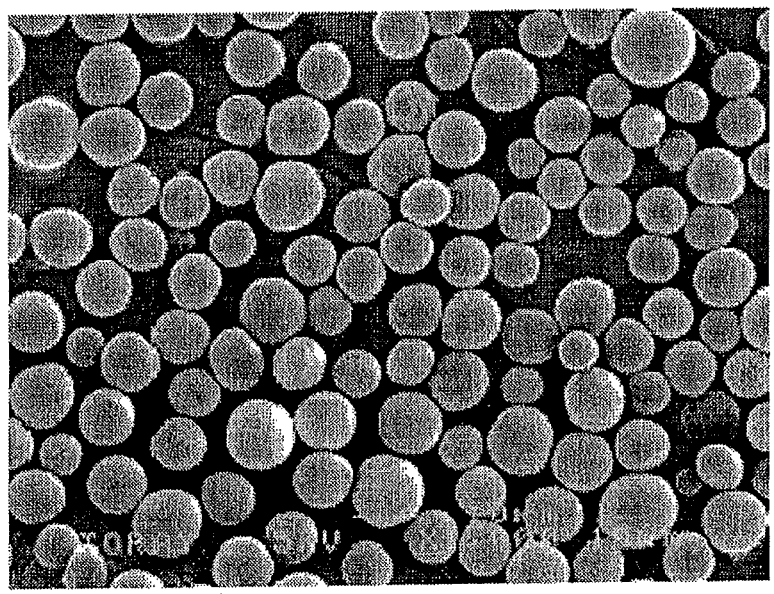
FIG. 9 is a diagram showing the result of observing polyamide 1010 polymer particles produced in Example 3 by a scanning electron microscope at a magnification of 1,000 times.

Example 3 Method of Producing Polyamide 1010 Polymer Particles 35 g of polyamide 1010 (weight average molecular weight: 22,500, "Hiprolon" (registered trademark) -200, supplied by Hipro Polymers Co. Ltd.), 273 g of N-methyl-2-pyrrolidone as the organic solvent and 42 g of polyvinyl alcohol little with content of sodium acetate prepared in Reference Example 1 as the polymer B other than polyamide 1010 resin (weight average molecular weight: 29,000, SP value: 32.8 $(J/cm^3)^{1/2}$) were added into a 1,000 ml pressure resistant glass autoclave (supplied by Taiatsu Techno Corporation, Hyper Glaster, TEM-V1000N), after replaced with nitrogen of 99 volume % or more, heated up to 180° C., and stirred for 2 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 110 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 34.0 g of white solid material. When the obtained powder were observed by a scanning electron microscope, they were polyamide 1010 polymer particles having a true sphere-like particle shape (FIG. 9), an average particle diameter of 11.8 μm, and a particle diameter distribution index of 1.21. The sphericity of the polyamide 1010 polymer particles was 90, and when wide angle X-ray diffraction spectrum was determined, as diffraction angle 2θ, peaks were exhibited at positions of 20 degrees and 24 degrees (FIG. 3).

The melting point of the polyamide 1010 used in this Example was 207° C., the heat of fusion was 29.0 J/g, and the cooling crystallization temperature was 144° C. The SP value determined by the calculation method was 22.47 $(J/cm^3)^{1/2}$. Further, the estimated value of the interfacial tension of this system was 2 mN/m or less. The solubility (room temperature) of polyamide relative to water, which was the poor solvent, was 0.1 mass % or less.

The estimation results of the properties of the obtained polyamide 1010 polymer particles were shown in Table 1. The polyamide 1010 polymer particles according to this Example had a true sphere-like shape, and were excellent in surface smoothness and excellent in particle flowability and stiffness.

When the molecular weight of polyvinyl alcohol in the filtrated solution after finishing to make particles was determined, the weight average molecular weight was 28,500, and it almost did not change from the value before being used.

Comparative Example 1

Based on the method disclosed in JP-A-2007-277546, polyamide 1010 polymer particles were produced. 24.0 g of polyamide 1010 (weight average molecular weight: 22,500, "Hiprolon" (registered trademark) -200, supplied by Hipro Polymers Co. Ltd.), 40.0 g of oligosaccharide (reduced starch sugar PO-10, supplied by Mitsubishi Shoji Foodtech Co., Ltd.) and 16.0 g of pentaerythritol were added into a laboratory plastomill heated at 230° C., and melt-blended for five minutes at a rotational speed of 50 rpm. After cooling, the obtained block-like material was supplied to ion exchange water, washed at 60° C., and the filtrated substances were vacuum dried at 80° C. for 10 hours to obtain 21.0 g of powder-like brown solid material.

Figure 4:
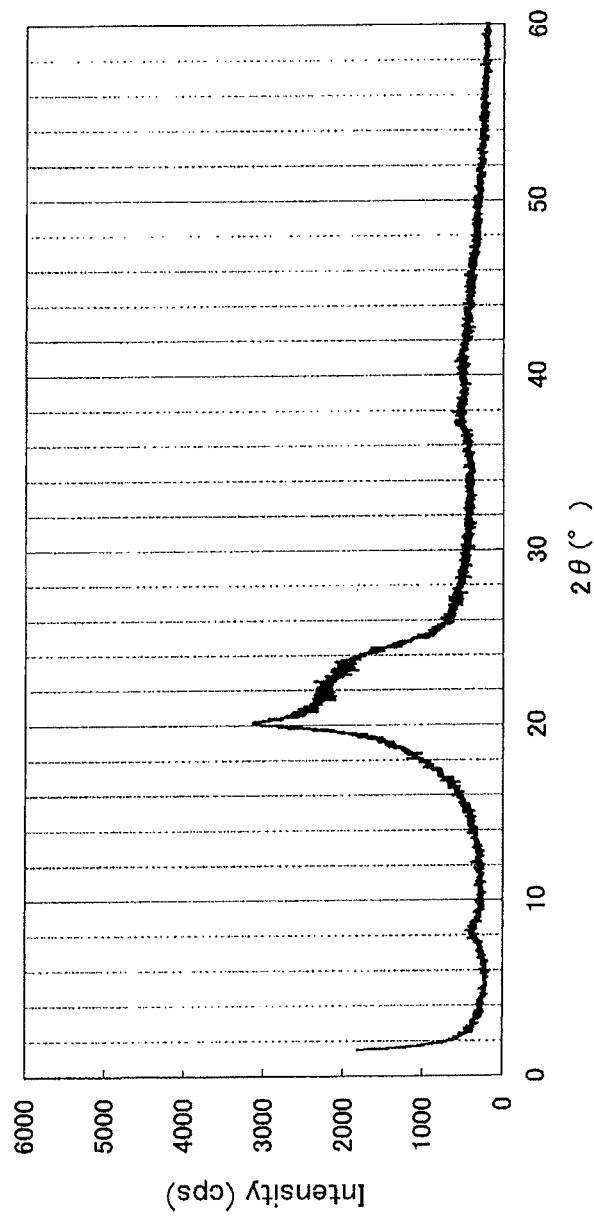
FIG. 4 is an X-ray determination chart of polyamide 1010 polymer particles produced in Comparative Example 1.
Figure 10:
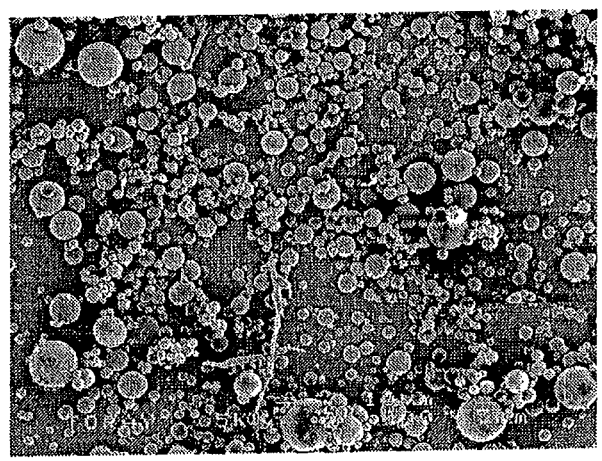
FIG. 10 is a diagram showing the result of observing polyamide 1010 polymer particles produced in Comparative Example 1 by a scanning electron microscope at a magnification of 1,000 times.

When the obtained powder were observed by a scanning electron microscope, they had a particle shape with a smooth surface (FIG. 10), an average particle diameter of 7.0 μm, and a particle diameter distribution index of 12.59. With respect to the polyamide 1010 polymer particles, when wide angle X-ray diffraction spectrum was determined, as diffraction angle 2θ, although a peak was exhibited at a position of 20 degrees, a peak was not exhibited at a position of 24 degrees (FIG. 4). The estimation results of the properties of the obtained polyamide 1010 polymer particles were shown in Table 1. The obtained particles were low in lightness, and poor in particle flowability.

Comparative Example 2

Figure 5:
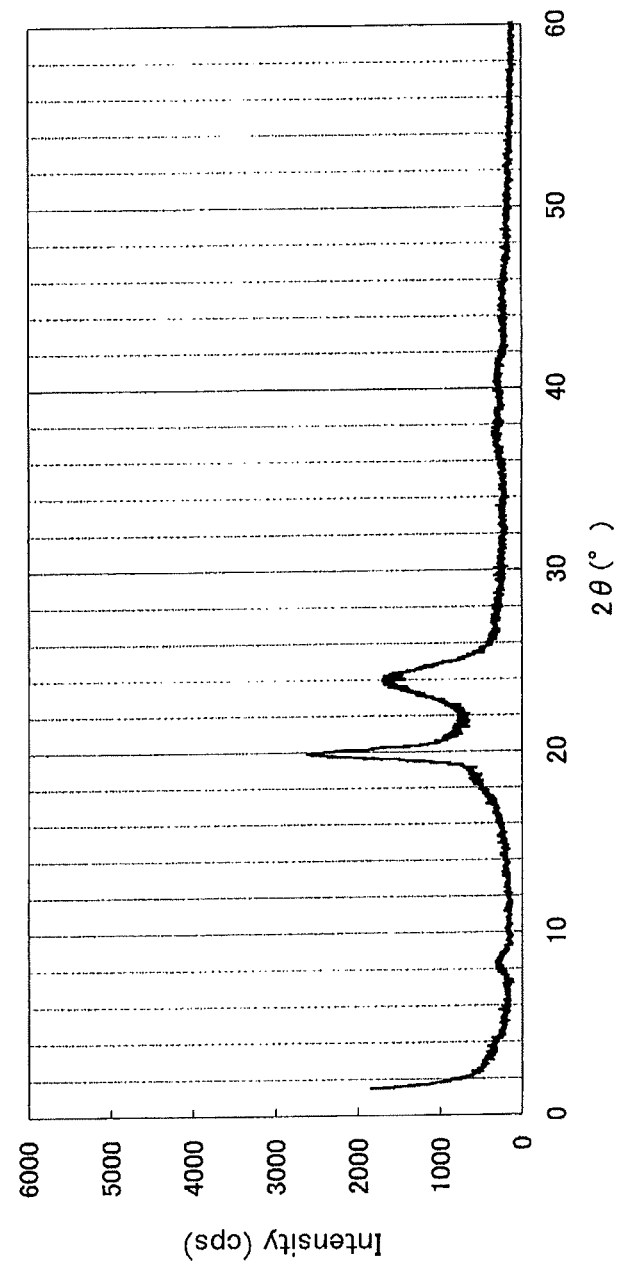
FIG. 5 is an X-ray determination chart of polyamide 1010 polymer particles produced in Comparative Example 2.
Figure 11:
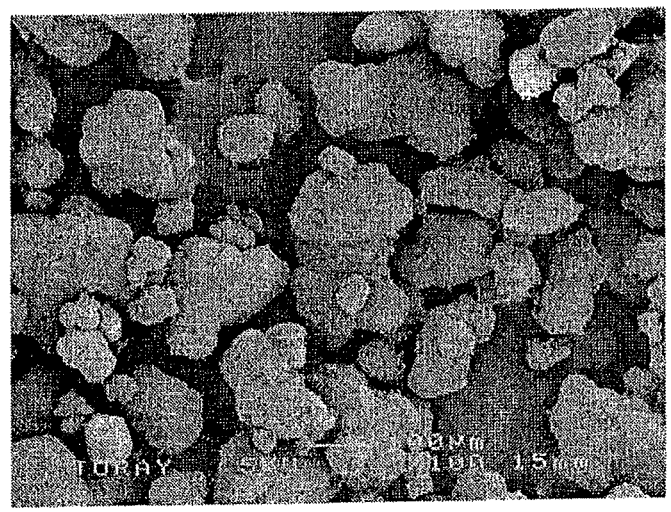
FIG. 11 is a diagram showing the result of observing polyamide 1010 polymer particles produced in Comparative Example 2 by a scanning electron microscope at a magnification of 100 times.

Based on the method disclosed in JP-A-2010-163618, polyamide 1010 polymer particles were produced. 56.5 g of polyamide 1010 (weight average molecular weight: 22,500, "Hiprolon" (registered trademark) -200, supplied by Hipro Polymers Co. Ltd.) and 280 g of ethanol as the organic solvent were added into a 1,000 ml pressure resistant glass autoclave (supplied by Taiatsu Techno Corporation, Hyper Glaster, TEM-V1000N), after replaced with nitrogen of 99 volume % or more, heated up to 155° C., and stirred by a paddle-type stirring blade at a rotational speed of 250 rpm for 1 hour until the polymers were dissolved. Thereafter, the temperature was lowered down to 125° C. while ethanol was continuously distillated, and the stirring was performed for 1 hour. Then, at the time reaching a temperature of 20° C. while being stirred, precipitation of resin started. At the time after 25 minutes while being distillated with ethanol and having finished with precipitation of resin, the temperature was lowered while being stirred, the precipitated powder were taken out, and vacuum dried at 50° C. for 10 hours to obtain 53 g of white solid material. When the obtained powder were observed by a scanning electron microscope, they were porous particles having atypical shape (FIG. 11), an average particle diameter of 149 μm, and a particle diameter distribution index of 30.7. With respect to the polyamide 1010 polymer particles, when wide angle X-ray diffraction spectrum was determined, as diffraction angle 2θ, although peaks were exhibited at positions of 20 degrees and 24 degrees (FIG. 5), the average particle diameter and the sphericity were out of the ranges defined by the present invention. The estimation results of the properties of the obtained polyamide 1010 polymer particles were shown in Table 1. The obtained particles had a rough feeling and were poor in particle flowability.

Comparative Example 3

Figure 6:
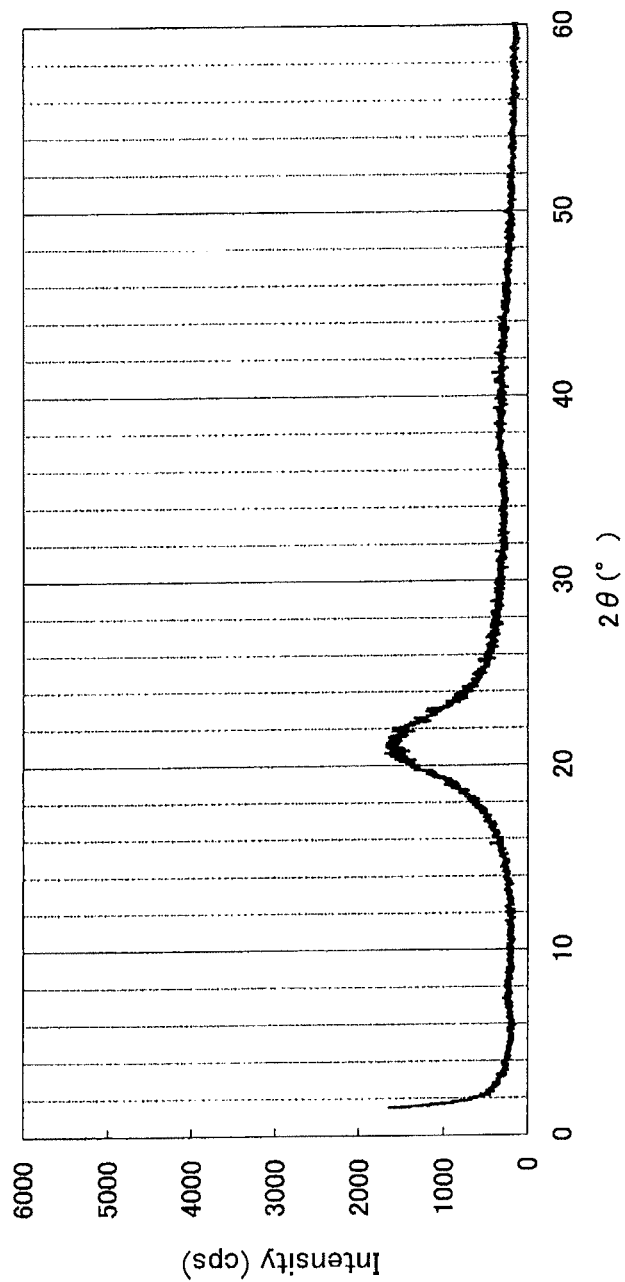
FIG. 6 is an X-ray determination chart of polyamide 1010 polymer particles produced in Comparative Example 3.
Figure 12:
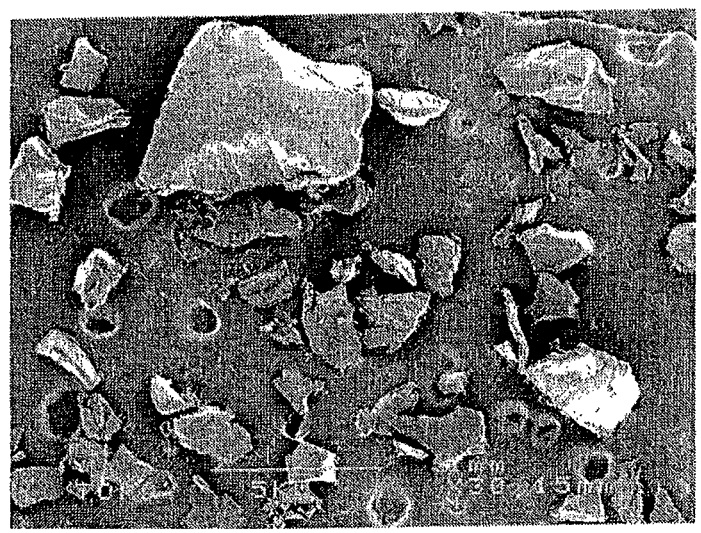
FIG. 12 is a diagram showing the result of observing polyamide 1010 polymer particles produced in Comparative Example 3 by a scanning electron microscope at a magnification of 30 times.

Using a freezer mill 6750 supplied by SPEX Corporation, 16 g of polyamide 1010 (weight average molecular weight: 22,500, "Hiprolon" (registered trademark) -200, supplied by Hipro Polymers Co. Ltd.) was freezing-milled in a liquid nitrogen at conditions of a milling time of 2 minutes, 20 impacting times and 3 milling times to obtain powder of polyamide 1010 resin. When the obtained powder were observed by a scanning electron microscope, they were powder having variously atypical shape (FIG. 12), an average particle diameter of 434 μm, and a particle diameter distribution index of 2.15. With respect to the polyamide 1010 powder, when wide angle X-ray diffraction spectrum was determined, as diffraction angle 2θ, a peak was not exhibited at a position of 24 degrees (FIG. 6). The estimation results of the properties of the obtained polyamide 1010 powder were shown in Table 1. The obtained powder had a great rough feeling because they were not spherical, and were poor in particle flowability because the particle diameters were not uniform.

TABLE 1

| | Unit | Example 1 | Example 2 | Example 3 | Comparative Example 1 | Comparative Example 2 | Comparative Example 3 |
|---|---|---|---|---|---|---|---|
| Average particle diameter | μm | 7.5 | 15.8 | 11.8 | 7 | 149 | 434 |
| Particle diameter distribution index | | 1.12 | 1.14 | 1.21 | 12.59 | 30.7 | 2.15 |
| X ray peak 2θ | degree | 20 | 20 | 20 | 20 | 20 | 21 |
| 2θ | degree | 24 | 24 | 24 | — | 24 | — |
| Sphericity | | 92 | 90 | 90 | 80 | 61 | 55 |
| Surface smoothness | SEM photograph observation | A | B | A | B | D | D |
| Particle flowability | Repose angle θ° | 20 | 22 | 20 | 46 | 32 | 44 |
| Stiffness | Elasticity modulus GPa | 2.01 | 2.08 | 2.05 | 1.75 | 0.55 | 1.66 |
| Bulk density | g/ml | 0.43 | 0.45 | 0.45 | 0.28 | 0.37 | 0.46 |
| Touch feeling | | ○ | ○ | ○ | ○ | X | X |
| Lightness | L value | 85 | 80 | 86 | 67 | 97 | 92 |

INDUSTRIAL APPLICATIONS

Our polymer particles can be suitably applied to any use requiring polyamide 1010 polymer particles excellent in surface smoothness, having a spherical form, good in particle flowability and excellent in stiffness.

The invention claimed is:

1. Polyamide 1010 polymer particles having an average particle diameter of 1 to 100 μm, a sphericity of 80 or higher, a peak exhibited at a position of 24 degrees in a spectrum of diffraction angle 2θ determined by wide angle X-ray scattering, a particle distribution index of 1 or more and 3 or less, and an L value, which is a lightness determined by spectrophotometry, is 70 or higher.

2. The polyamide 1010 polymer particles according to claim 1, wherein peaks are exhibited at positions of 20 degrees and 24 degrees in the spectrum of diffraction angle 2θ determined by wide angle X-ray scattering.

3. The polyamide 1010 polymer particles according to claim 1, wherein a repose angle of particles is 30 degrees or less.

4. The polyamide 1010 polymer particles according to claim 1, wherein a compressive elasticity modulus determined by a micro compression testing machine is 1.6 GPa or more.

* * * * *